US007813845B2

(12) United States Patent
Doose et al.

(10) Patent No.: US 7,813,845 B2
(45) Date of Patent: Oct. 12, 2010

(54) AIRPORT TAXIWAY NAVIGATION SYSTEM

(75) Inventors: Reagan Doose, Castle Rock, CO (US); Richard W. Ellerbrock, Highlands Ranch, CO (US); Glade L. Hulet, Castle Rock, CO (US); John M. Jaugilas, Centennial, CO (US); Matthew T. Majka, Parker, CO (US)

(73) Assignee: The Boeing Company, Chicago, IL (US)

( * ) Notice: Subject to any disclaimer, the term of this patent is extended or adjusted under 35 U.S.C. 154(b) by 639 days.

(21) Appl. No.: 10/369,187

(22) Filed: Feb. 19, 2003

(65) Prior Publication Data

US 2004/0006412 A1 Jan. 8, 2004

Related U.S. Application Data

(60) Provisional application No. 60/358,327, filed on Feb. 19, 2002, provisional application No. 60/358,339, filed on Feb. 19, 2002.

(51) Int. Cl.
 *G06F 19/00* (2006.01)
(52) U.S. Cl. .......................... 701/16; 340/961; 340/951; 340/972; 342/36
(58) Field of Classification Search .................... 701/22, 701/10, 120, 122, 16, 117; 340/951, 972, 340/958, 909, 945, 995.19, 995.15, 971, 340/961, 953; 342/33, 34, 35, 36; 345/418, 345/426, 428, 503, 7
See application file for complete search history.

(56) References Cited

U.S. PATENT DOCUMENTS

| 3,967,098 A | 6/1976 | Harnagel et al. |
| 4,147,056 A | 4/1979 | Muller |
| 4,224,669 A | 9/1980 | Brame |
| 4,642,775 A | 2/1987 | Cline et al. |
| 4,845,495 A | 7/1989 | Bollard et al. |
| 4,939,661 A | 7/1990 | Barker et al. |

(Continued)

FOREIGN PATENT DOCUMENTS

DE 4140406 A 6/1993

(Continued)

OTHER PUBLICATIONS

Hooey, B.C., Foyle, D.C., Andre, A.D., Parke, B., "Integrating datalink and cockpit display technologies into current and future taxi operations", Digital Avionics Systems Conferences, 2000. Proceedings. DASC. The 19th vol. 2, Oct. 7-13, 2000 pp. 7D2/1-7D2/8 vol. 2 Digital Object Identifier 10.1109/DASC.2000.884933.*

(Continued)

*Primary Examiner*—Tuan C To
(74) *Attorney, Agent, or Firm*—Perkins Coie LLP

(57) ABSTRACT

A method and system for providing taxiway navigational information to a crewmember of an airplane taxiing at an airport. An airport taxiway navigation system ("ATNS") that executes on an onboard computer system that displays a map of the taxiways of an airport, receives the name of each taxiway of the taxi route specified by the taxi clearance, and highlights the taxiways on a displayed map to provide a visual indication of the cleared taxi route for the crewmembers.

21 Claims, 25 Drawing Sheets

U.S. PATENT DOCUMENTS

| | | | |
|---|---|---|---|
| 5,053,967 A | | 10/1991 | Clavelloux et al. |
| 5,200,902 A | * | 4/1993 | Pilley .......................... 701/120 |
| 5,243,339 A | | 9/1993 | Graham et al. |
| 5,283,643 A | | 2/1994 | Fujimoto |
| 5,329,277 A | | 7/1994 | Dougan et al. |
| 5,343,395 A | * | 8/1994 | Watts ........................... 701/16 |
| 5,475,594 A | | 12/1995 | Oder et al. |
| 5,519,392 A | | 5/1996 | Oder et al. |
| 5,519,618 A | * | 5/1996 | Kastner et al. .............. 701/120 |
| 5,592,198 A | | 1/1997 | Fagard |
| 5,593,114 A | * | 1/1997 | Ruhl ........................... 244/183 |
| 5,629,691 A | * | 5/1997 | Jain ............................ 340/961 |
| 5,715,163 A | | 2/1998 | Bang et al. |
| 5,736,955 A | * | 4/1998 | Roif ............................. 342/33 |
| 5,745,054 A | | 4/1998 | Wilkens |
| 5,745,866 A | | 4/1998 | Steiner |
| 5,790,209 A | | 8/1998 | Engelhardt et al. |
| 5,798,712 A | | 8/1998 | Coquin |
| 5,802,492 A | | 9/1998 | DeLorme et al. |
| 5,825,306 A | | 10/1998 | Hiyokawa et al. |
| 5,995,901 A | | 11/1999 | Owen et al. |
| 6,067,502 A | | 5/2000 | Hayashida et al. |
| 6,112,141 A | | 8/2000 | Briffe et al. |
| 6,121,899 A | | 9/2000 | Theriault |
| 6,128,553 A | | 10/2000 | Gordon et al. |
| 6,161,062 A | | 12/2000 | Sicre et al. |
| 6,163,309 A | * | 12/2000 | Weinert ........................... 345/7 |
| 6,181,987 B1 | * | 1/2001 | Deker et al. ..................... 701/3 |
| 6,199,015 B1 | * | 3/2001 | Curtwright et al. .......... 701/213 |
| 6,246,342 B1 | * | 6/2001 | Vandevoorde et al. ....... 340/961 |
| 6,289,277 B1 | | 9/2001 | Feyereisen et al. |
| 6,314,343 B1 | | 11/2001 | Adams et al. |
| 6,314,363 B1 | * | 11/2001 | Pilley et al. ................. 701/120 |
| 6,381,538 B1 | | 4/2002 | Robinson et al. |
| 6,424,909 B2 | | 7/2002 | Kusano et al. |
| 6,442,394 B1 | | 8/2002 | Valentine et al. |
| 6,449,556 B1 | | 9/2002 | Pauly |
| 6,453,236 B1 | | 9/2002 | Aoki |
| 6,462,697 B1 | * | 10/2002 | Klamer et al. ................. 342/36 |
| 6,512,527 B1 | | 1/2003 | Barber et al. |
| 6,542,796 B1 | | 4/2003 | Gibbs et al. |
| 6,545,601 B1 | * | 4/2003 | Monroe ....................... 340/521 |
| 6,553,307 B2 | * | 4/2003 | Stratton et al. .............. 701/120 |
| 6,561,463 B1 | | 5/2003 | Yount et al. |
| 6,571,166 B1 | * | 5/2003 | Johnson et al. ............. 701/120 |
| 6,606,563 B2 | * | 8/2003 | Corcoran, III ............... 701/301 |
| 6,614,397 B2 | * | 9/2003 | Pullen et al. ................. 342/456 |
| 6,614,419 B1 | | 9/2003 | May |
| 6,633,810 B1 | | 10/2003 | Qureshi et al. |
| 6,690,295 B1 | * | 2/2004 | De Boer ..................... 340/951 |
| 6,690,299 B1 | | 2/2004 | Suiter |
| 6,693,559 B1 | | 2/2004 | Gyde et al. |
| 6,694,249 B1 | * | 2/2004 | Anderson et al. ........... 701/120 |
| 6,707,475 B1 | * | 3/2004 | Snyder ....................... 345/771 |
| 6,721,640 B2 | | 4/2004 | Glenn et al. |
| 6,735,505 B2 | | 5/2004 | Levine |
| 6,745,113 B2 | | 6/2004 | Griffin, III et al. |
| 6,751,545 B2 | | 6/2004 | Walter |
| 6,789,010 B2 | * | 9/2004 | Walter ........................ 701/120 |
| 6,812,858 B2 | | 11/2004 | Griffin, III |
| 6,842,672 B1 | | 1/2005 | Straub et al. |
| 6,856,864 B1 | | 2/2005 | Gibbs et al. |
| 6,862,519 B2 | | 3/2005 | Walter |
| 6,897,790 B2 | | 5/2005 | Orton |
| 6,927,782 B2 | | 8/2005 | Coldefy et al. |
| 6,946,976 B1 | | 9/2005 | Langner et al. |
| 6,957,130 B1 | | 10/2005 | Horvath et al. |
| 6,980,198 B1 | | 12/2005 | Gyde et al. |
| 7,024,287 B2 | | 4/2006 | Peckham et al. |
| 7,039,509 B2 | | 5/2006 | Podowski |
| 7,049,953 B2 | | 5/2006 | Monroe |
| 7,072,746 B1 | | 7/2006 | Burch |
| 7,093,070 B2 | | 8/2006 | Rowlan |
| 7,142,131 B2 | | 11/2006 | Sikora |
| 7,148,814 B2 | | 12/2006 | Sikora et al. |
| 7,177,731 B2 | | 2/2007 | Sandell et al. |
| 7,181,478 B1 | | 2/2007 | Korson et al. |
| 7,188,007 B2 | | 3/2007 | Boorman et al. |
| 7,203,577 B2 | | 4/2007 | Gunn et al. |
| 7,222,017 B2 | | 5/2007 | Clark et al. |
| 7,230,632 B2 | | 6/2007 | Coldefy et al. |
| 7,256,710 B2 | | 8/2007 | Griffin, III et al. |
| 7,345,693 B2 | | 3/2008 | Coldefy et al. |
| 7,363,119 B2 | | 4/2008 | Griffin, III et al. |
| 2002/0030609 A1 | * | 3/2002 | Baumgartner et al. ....... 340/958 |
| 2002/0080046 A1 | * | 6/2002 | Derringer .................... 340/945 |
| 2002/0099528 A1 | * | 7/2002 | Hett ............................. 703/13 |
| 2002/0113719 A1 | * | 8/2002 | Muller et al. ................ 340/961 |
| 2002/0120392 A1 | * | 8/2002 | Stratton et al. .............. 701/120 |
| 2003/0009278 A1 | | 1/2003 | Mallet et al. |
| 2003/0045994 A1 | * | 3/2003 | Stratton et al. .............. 701/120 |
| 2004/0059474 A1 | | 3/2004 | Boorman et al. |
| 2004/0059497 A1 | | 3/2004 | Sankrithi |
| 2004/0230352 A1 | | 11/2004 | Monroe |
| 2005/0090969 A1 | | 4/2005 | Siok et al. |
| 2005/0178903 A1 | | 8/2005 | Boorman et al. |
| 2005/0192717 A1 | | 9/2005 | Tafs et al. |
| 2005/0203675 A1 | | 9/2005 | Griffin et al. |
| 2005/0222721 A1 | | 10/2005 | Chen et al. |
| 2005/0228674 A1 | | 10/2005 | Gunn et al. |
| 2005/0231390 A1 | | 10/2005 | Crane et al. |
| 2008/0091311 A1 | | 4/2008 | Boorman et al. |
| 2008/0316058 A1 | | 12/2008 | Chen et al. |
| 2009/0062972 A1 | | 3/2009 | Boorman et al. |

FOREIGN PATENT DOCUMENTS

| | | |
|---|---|---|
| EP | 0370640 | 5/1990 |
| EP | 0489521 | 6/1992 |
| EP | 1273987 | 1/2003 |
| GB | 2144248 | 2/1985 |
| JP | 05338594 | 12/1993 |
| JP | 07113652 A | 5/1995 |
| JP | 2002013935 A | 1/2002 |
| WO | WO-02/24530 | 3/2002 |

OTHER PUBLICATIONS

Jones, D.R. et al., "Airport Surface Movement Technologies-Atlanta Demonstration Overview," Proceedings of 17th Digital Avionics Systems Conference, Bellevue, WA, USA, Oct. 31-Nov. 7, 1998, pp. F-21/1-10, vol. 2, New York, NY, USA, IEEE, USA. ISBN: 0-7803-5086-3, pp. F21/6-7.

Batson V.M. et al., "Navigating the Airport Surface: Electronic vs. Paper Maps," AIAA/IEEE Digital Avionics Systems Conference, 13th DASC, Phoenix, AZ, USA, Oct. 30-Nov. 3, 1994, pp. 515-520, XP001012787, 1994, New York, NY, USA, IEEE, USA. ISBN: 0-7803-2425-0, p. 517, right-hand column, Paragraph 1.

Jones, D.R. et al., "Flight Demonstration of Integrated Airport Surface Automation Concepts," Proceedings of the 14th Digital Avionics Systems Conference, Cambridge, MA, USA, Nov. 5-9, 1995, pp. 77-82, XP002241831, 1995, New York, NY, USA, IEEE, USA. ISBN: 0-7803-3050-1, p. 79, left-hand column, Paragraph 1, p. 79, right hand column, paragraph 3, figure 2.

Hutchins, Edwin, "The Integrated Mode Management Interface," Final report for grant # NCC 2-591 from the Ames Research Center of the National Aeronautices and Space Administration in the Aviation Safety / Automation Program, pp. 1-50 and Appendixes 1-5.

Lindenfeld, Ron, "What is an FMS?" <http://www.ultranet.com/~marzgold/FAQ-FMS.html>, Accessed Jun. 3, 2002, pp. 1-5.

U.S. Appl. No. 12/139,416, filed Jun. 13, 2008, Clark et al.

European Extended Search Report, European Application No. 08163184.8, Applicant: The Boeing Company, mailed Aug. 5, 2009, 8 pages.

Mejdal et al., "Human Factors Design Guidelines for Multifunction Displays," U.S. Department of Transportation, Oct. 2001, 79 pages.

Theunissen E. et al., "Development and implementation of an Exocentric ASMGCS display," Digital Avionics Systems Conferences, 2000, vol. 2, pp. 7.D 5-1-5.8, Oct. 7, 2000.

Andre, A.D. "Information Requirements for Low-Visibility Taxi Operations: What Pilots Say." 8th International Symposium on Aviation Psychology, 1995, Columbus, OH.

McCann, R.S., et al. "Enhancing Taxi Performance Under Low Visibility: Are Moving Maps Enough?" Paper Presenting at the Human Factors and Ergonomics Society 41st Annual Meeting, 1997, Santa Monica, CA.

McCan, R.S, et al. "Advanced Navigation Aids in the Flight Deck: Effects on Ground Taxi Performance Under Low Visibility Conditions." Paper Presented at the World Aviation Congress, 1996, Los Angeles, CA.

Theunissen, E. et al. "Design and Evaluation of Taxi Navigation Displays." Paper presented at the Proceeding of the 21st Digital Avionics Systems Conference, 2002, Irvine, CA.

* cited by examiner

AIRPORT TAXIWAY NAVIGATION SYSTEM

CROSS-REFERENCE TO RELATED APPLICATIONS

This application claims the benefit of U.S. Provisional Application No. 60/358,327 and U.S. Provisional Application No. 60/358,339 both filed Feb. 19, 2002, which are incorporated herein by reference in their entirety.

BACKGROUND

The described technology relates generally to navigation systems and particularly to a navigation system for an airplane taxiing at an airport.

When an airplane lands at an airport, the ground control personnel for that airport provide a taxi clearance to the crewmembers of the airplane. The taxi clearance specifies a taxi route that the airplane is to use in taxiing from the runway to the destination gate. Ground control personnel select a taxi clearance that facilitates taxiing from the landing runway to the destination gate or from the departing gate to the takeoff runway, that reduces congestion on the taxiways, and enhances safety. The ground control personnel radio the taxi route to the crewmembers, providing the names of the taxiways of the cleared taxi route. The names of the taxiways typically consist of one or two letters followed by an optional number. Example names of taxiways at an airport may be "A1," "A2," "E1," "E2," and "WC." The ground control personnel may identify a taxi route by saying "echo two alpha one charlie three." A crewmember may write down the names of the taxiways and then use those taxiways to taxi the airplane to the gate. Each taxiway is identified by one or more signs marked with its respective name. While taxiing, a crewmember can compare the names on the signs with the written-down names.

It is, of course, important for an airplane to follow its cleared taxi route. The typical taxiing process is, however, subject to human error. For example, a crewmember may incorrectly hear the name of a taxiway or may incorrectly write down the name of a taxiway. In addition, since adverse weather conditions may affect the visibility of the names of the taxiways on the signs, a crewmember may incorrectly identify a taxiway. As a result of these errors, a crewmember may inadvertently taxi the airplane onto an incorrect taxiway.

In addition to taxiing on the correct taxiways, it is important for crewmembers to recognize and stop their airplane at holdshort lines. A holdshort line is typically found at the intersection of a taxiway and a runway or at the intersection of a low-speed taxiway and a high-speed taxiway. A taxiing airplane should stop at each holdshort line until clearance is received from ground control to allow faster moving airplanes to pass.

It would be desirable to have a taxiing navigation system that would help ensure that the crewmembers of a taxiing airplane correctly receive the cleared taxi route, correctly follow that taxi route, and stop at holdshort lines as appropriate.

BRIEF SUMMARY OF THE INVENTION

A method and system for providing taxiway navigational information to a crewmember of an airplane taxiing at an airport is provided. In one embodiment, an airport taxiway navigation system ("ATNS") that executes on an onboard computer system displays a map of the taxiways of an airport (e.g., an airport diagram), receives the name of each taxiway of the taxi route specified by a taxi clearance, and highlights the taxiways on the displayed map to provide a visual representation of the cleared taxi route for the crewmembers (or, more generally, users). The ATNS may also receive position and heading information, for example, from the Avionics or Aircraft System Bus ("AASB"), and may superimpose an indication of the current position and heading of the airplane on the displayed map. In this way, crewmembers can track the taxiing of the airplane so they will know when the airplane is approaching the next taxiway in the cleared taxi route, know which way to turn, and know whether the airplane has deviated from the cleared taxi route.

DETAILED DESCRIPTION

Figure 1:
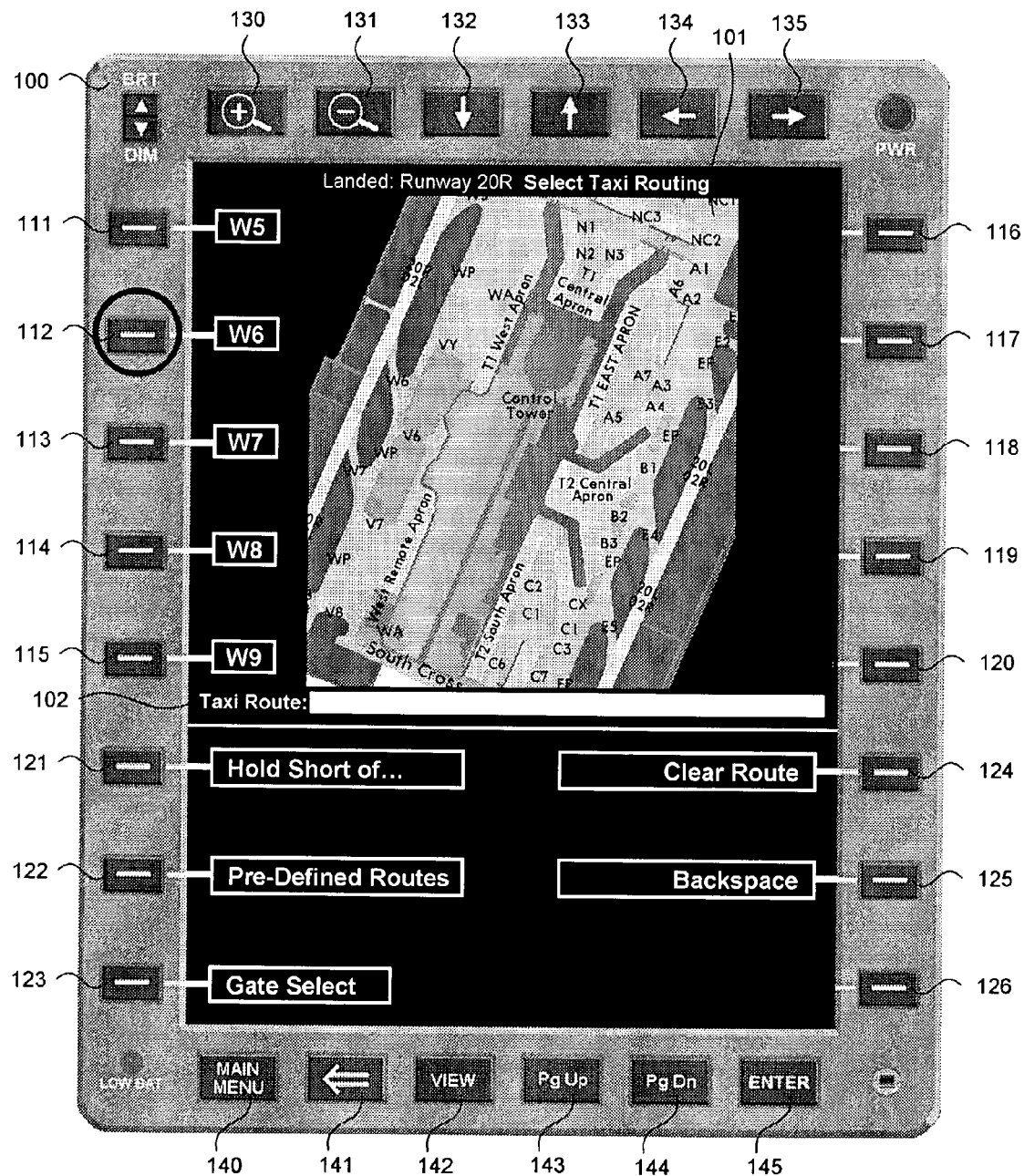
FIG. 1 illustrates a user interface of an onboard computer system executing the software of the airport taxiway navigation system ("ATNS").

A method and system for providing taxiway navigational information to a crewmember of an airplane taxiing at an airport is provided. In one embodiment, an airport taxiway navigation system ("ATNS") that executes on an onboard computer system displays a map of the taxiways of an airport (e.g., an airport diagram), receives the name of each taxiway of the taxi route specified by a taxi clearance, and highlights the taxiways on the displayed map to provide a visual representation of the cleared taxi route for the crewmembers (or, more generally, users). The ATNS may also receive position and heading information, for example, from the Avionics or Aircraft System Bus ("AASB"), and may superimpose an indication of the current position and heading of the airplane on the displayed map. In this way, crewmembers can track the taxiing of the airplane so they will know when the airplane is approaching the next taxiway in the cleared taxi route, know which way to turn, and know whether the airplane has deviated from the cleared taxi route.

The ATNS may receive the cleared taxi route either by manual input from a crewmember or by input from a ground control computer system. A crewmember may input the taxiways of the cleared taxi route in various ways. For example, the ATNS may display the names of all taxiways at the airport and allow a crewmember to manually select the taxiways of the cleared taxi route. In one embodiment, the ATNS may, after each taxiway is selected, display only the names of the next logically possible taxiways. For example, the next logically possible taxiways might be those taxiways that intersect the last selected taxiway. The ATNS may order the displayed taxiway names alphabetically or based on the likelihood of their being the next selected taxiway. For example, if the ATNS knows the destination gate, it may order the taxiway names based on the distance from the runway through each taxiway to the destination gate. The ATNS may allow a crewmember to select a taxiway by pressing a button (e.g., a hardware button or a soft button displayed on a touch-panel display) or by pointing to the taxiway when the map is displayed on a touch-panel display. As the crewmember selects the taxiways, the ATNS may highlight them on the display. The ATNS may also allow a crewmember to enter the taxi route into a taxi route text box using a keypad. For example, the crewmember may enter "E2, A1, C3" as the taxi route is provided by ground control. In one embodiment, the ATNS provides a "virtual keypad" for entry of the taxi route. A virtual keypad is a pad of numbers and letters displayed on a display (e.g., a touch-panel display) to support data entry. When the crewmember indicates that a taxi route is to be input, the ATNS displays the virtual keypad. Once the taxi route is accepted, the ATNS removes the keypad and displays an airport diagram with the filled-in taxi route text box. As the taxiways of the cleared taxi route are input (e.g., manually), the ATNS highlights the taxiways on the displayed map and may display the name of the taxiway in the taxi route text box. The taxi route text box displays the names of the taxiways in the cleared taxi route and may be used by the crewmember when confirming the cleared taxi route with ground control. In addition, the ATNS may highlight the name of a taxiway in the taxi route text box as the airplane taxis on that taxiway, and the ATNS may provide an additional highlight (e.g., blinking) of that taxiway on the map. In this way, crewmembers will have enhanced situational awareness during taxiing at an airport.

In one embodiment, the ATNS may receive the identity of a gate and runway at the beginning and end of a taxi route input by a crewmember. To facilitate entry of gate information by a crewmember, the ATNS may display the names of the concourses of the airport and allow a crewmember to select a concourse. After the concourse is selected, the ATNS displays the names of the gates for the selected concourse and allows the crewmember to select the destination or departing gate. The ATNS then highlights the gate on the displayed map. The ATNS displays the name of the runways so that a crewmember can select the landing or takeoff runway.

A ground control computer may electronically (e.g., using radio frequency) transmit taxi clearance information to the flight management computer of the airplane in one embodiment. If so, the ATNS may retrieve the cleared taxi route, gate, and runway directly from the flight management computer. In this way, human error from incorrectly hearing or entering a cleared taxi route, gate, and runway is avoided.

In an alternate embodiment, the ATNS allows the map to be displayed in static mode or dynamic mode. In static mode, the map is held stationary and an indication (e.g., graphic representation of an airplane) of the current position of the airplane as it taxis moves relative to the displayed map. One example of the static mode is referred to as "north up mode," where the top of the display represents north. In dynamic mode, the display of the map moves as the airplane taxis, and the current position of the airplane is shown as a fixed position on the display. One example of the dynamic mode is referred to as a "heading up mode." The ATNS may allow a crewmember to toggle between a dynamic and static mode.

In one embodiment, the ATNS allows the map to be displayed in an "align-to-runway" mode, which is another example of a static mode display of the map. When in the align-to-runway mode, the ATNS displays the map with a selected runway aligned vertically and centered horizontally. A crewmember can selected the align-to-runway mode as an alternative to the heading up and north up modes. The ATNS may automatically select the align-to-runway mode when an airplane is approaching a runway for landing. When on approach, the airplane's heading may not be aligned with the runway, for example, because of crosswinds (i.e., referred to as "crabbing"). The heading alignment may be several degrees offset from the runway alignment. If the ATNS was displaying the map in heading up mode, the landing runway might not even be visible on the display because of the offset. Also, when an airplane lands, it might change its heading rapidly to align with the runway. This rapid change in alignment may result in a sudden and distracting change in the orientation of the map. By using the align-to-runway mode, the ATNS ensures that the runway is visible on the map during the approach and that a sudden change in map orientation does not occur when the airplane lands.

In one embodiment, the ATNS may automatically transition from align-to-runway mode to heading up mode when the airplane lands. This transition is smooth because, when the heading is aligned with the runway, both modes display the same orientation of the map. The ATNS may also use the align-to-runway mode when an airplane takes off. If the heading up mode is used when an airplane takes off, then a sudden change in map orientation will occur if the airplane has a rapid heading change. To avoid this sudden change in map orientation, the ATNS may automatically switch from heading up mode to align-to-runway mode as the airplane takes off.

The align-to-runway mode can also be used by a crewmember to plan the landing of the airplane at an airport. The runway to align to (e.g., the landing runway) can be selected manually by a crewmember (e.g., by pointing to the runway) or automatically based on information retrieved from the AASB. In the align-to-runway mode, the crewmember can communicate with the ground control personnel while viewing the airport from the perspective of the landing runway. This align-to-runway view may make it easier for a crewmember to point to the taxiways when defining the cleared taxi route to the ATNS.

In another embodiment, the ATNS allows for the defining of preferred taxi routes for an airport. Each preferred taxi route may have a name associated with it or may be identified by the sequence of its taxiway names. If a cleared taxi route corresponds to a preferred taxi route, a crewmember need only select the preferred taxi route and need not individually identify each taxiway of the cleared taxi route. In addition, the ATNS may allow a crewmember or an operations and aircraft maintenance person to define new preferred taxi routes in much the same way as a cleared taxi route is specified. The virtual keypad can be used to enter a name for a preferred taxi route. The use of preferred taxi routes helps reduce the time it takes a crewmember to specify the cleared taxi route to the ATNS.

In one embodiment, the ATNS system may notify crewmembers when position information indicates that their airplane is deviating from the cleared taxi route or is nearing the edge of a taxiway. The ATNS retrieves the position information (e.g., from the AASB) and identifies the current taxiway. If the current taxiway is not on the cleared taxi route, then the ATNS may provide a visual or audio notification to the crew. The ATNS may also compare the current position of the airplane to the edge of the current taxiway. If the current position indicates that the airplane is within a certain distance of the edge of the taxiway (e.g., a horizontal integrity limit), then the ATNS may provide a visual or audio notification to the crew.

In another embodiment, the ATNS can identify the airport at which the airplane is landing or taking off based on position information retrieved from the AASB. The ATNS provides a mapping of position information to supported airports. Once the airport is identified from the mapping, the ATNS retrieves and displays a map for that airport. The ATNS also uses the identification of the airport to retrieve taxiway, preferred taxi routes, runway, and gate information. In an alternate embodiment, the ATNS may retrieve the identity of the airport from the AASB.

A crewmember may start the ATNS application through a main menu that lists the applications available on the onboard computer system. Alternatively, the ATNS application can be automatically started based on various aircraft events. For example, the ATNS application may be started when the airspeed of the aircraft is less than 100 knots or if Weight On Wheels ("WOW") is detected, as indicated by the AASB. It may also be started when a certain signal is received from a ground control computer system.

In one embodiment, the ATNS may estimate (e.g., extrapolate) the current position and heading of an airplane as it taxis based on previous position and heading information received from the AASB. For example, the ATNS may receive position and heading information from the AASB once every second. If the ATNS updates the representation of the position, speed, and heading of the airplane only once a second, then when the airplane is taxiing at high speed or the map of the airport is shown zoomed-in, the positions of the airplane may tend to look discontinuous (e.g., jittery). To avoid this visual discontinuity, the ATNS may update the indicated position and heading more frequently (e.g., 10 times a second) based on estimates of the current position and heading.

The ATNS in one embodiment allows a crewmember to add various types of annotations to the map. For example, a crewmember when planning the taxiing at an airport may use a freehand drawing tool to cross out those taxiways that are closed (e.g., because of repairs or ice). The annotations may be made using freehand drawings, icon placement, text boxes, and so on. The ATNS associates each annotation with a position on the map so that the annotations can be appropriately displayed as the map is scaled and panned or is displayed in static or dynamic modes. In freehand mode, the crewmember can use a pointing device to draw on the map. Some pointing devices allow for continuous selection of points, while other pointing devices allow for only discrete selection of a point. A touch-panel display or a light-pen display allows for the continuous selection of points as the crewmember moves the pointing device, for example, to mark a line. Certain pointing devices, in contrast, only allow a discrete point to be selected at a time. With such a pointing device, the ATNS allows a crewmember to select two points and then indicate to draw a line between the points. When more than two points are selected, the points are vertices of lines connecting the points. In icon placement mode, the ATNS allows a crewmember to place icons on the map as annotations. For example, a crewmember may drag and drop an icon of the international "not" symbol over a taxiway that is closed. The ATNS then displays that icon over the taxiway whenever the taxiway is displayed. In text box mode, the crewmember can select a position on the map and enter text in a text box that is associated with that position. The crewmember can enter the text using a virtual keypad. The ATNS displays the text box whenever that associated position on the map is displayed. The ATNS may allow a crewmember to toggle between displaying (i.e., unhiding) and not displaying (i.e., hiding) the annotations. The ATNS may also allow a crewmember to manually indicate when some or all of the annotations for a map of an airport are to be discarded. Alternatively, the ATNS may automatically discard all the annotations for the take off or landing airports as part of the flight initialization process. In one embodiment, some annotations may be designated as "persistent" to indicate that they are not to be automatically discarded between flights.

FIGS. 1-15 illustrate the user interface of the ATNS in one embodiment.

FIG. 1 illustrates the user interface of an onboard computer system executing the software of the airport taxiway navigation system ("ATNS"). Image 100 includes map display area 101, a taxi route text box 102, taxiway/gate buttons 111-120, menu buttons 121-126, map control buttons 130-135, and control buttons 140-145. The map display area 101 displays the map of an airport. The taxiway/gate buttons are used to select the various taxiways of a taxi route, or the concourse and gate, depending on the current mode of the ATNS. The ATNS may be in one of several modes, such as a taxi route input mode, a gate input mode, a runway input mode, or an airplane tracking mode. As illustrated, the ATNS has displayed the names of taxiways to the right of taxiway/gate buttons 111-115. In this example, a crewmember selects taxiway/gate button 112 corresponding to the taxiway "W6" as the first taxiway of the taxi route. The menu buttons 121-126 are used to select the different modes of the ATNS, as indicated by the text corresponding to the buttons. For example, menu button 123 when selected places the ATNS in a gate input mode. The map control buttons 130-135 are used to zoom in and out of the map and scroll the map up and down or left and right. The control buttons 140-145 may be used to control the display associated with the taxiway/gate buttons 111-120. For example, when the number of taxiways that are available to be selected exceeds 10 (i.e., the number of taxiway/gate buttons), then a crewmember selects the page up button 143 or the page down button 144 to display a next or previous group of taxiways. The actual function of the control buttons may depend on the current mode of the ATNS.

In one embodiment, the ATNS uses maps of an airport generated from actual satellite images of the airport to help ensure the accuracy of the map. To generate the map, various landmarks of the airport may be identified on the satellite image. The actual measurements of the airport objects (e.g., runway, taxiway, and concourses) are then derived from the landmarks. Such maps may be represented as vectors that define the boundaries of airport objects. The ATNS may also have a mapping between the airport objects and their names (e.g., "E1" maps to the vectors defining that taxiway). The ATNS may use this mapping to highlight or label the airport objects on the map. In one embodiment, the labels of the airport objects are displayed horizontally on the display, regardless of the orientation of the map, to facilitate readability.

Figure 2:
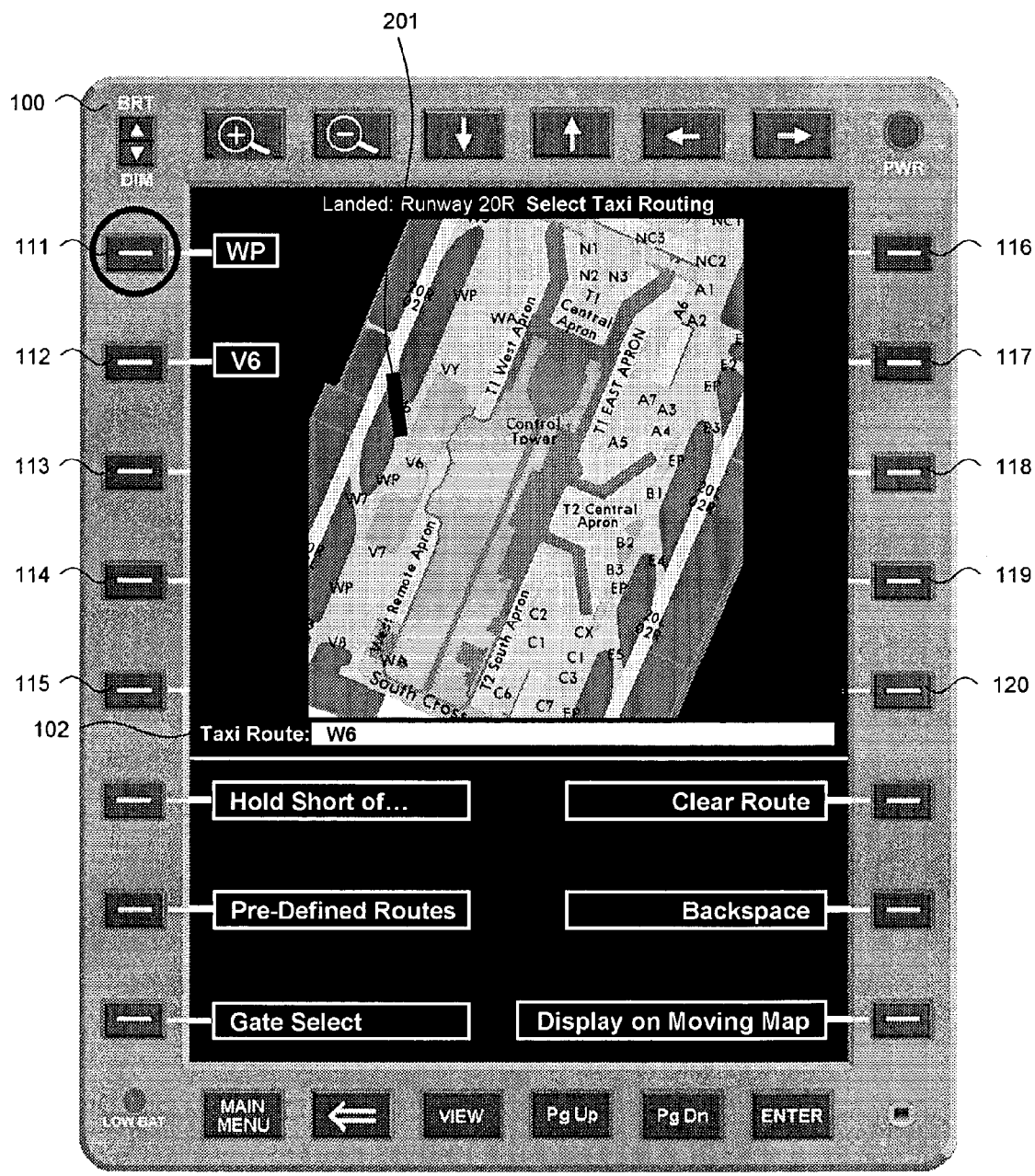
FIG. 2 illustrates the user interface of the ATNS after a crewmember has identified the first taxiway of a cleared taxi route.

FIG. 2 illustrates the user interface of the ATNS after a crewmember has identified the first taxiway of a cleared taxi route. As shown in FIG. 1, the crewmember selected taxiway "W6" as the first taxiway of the cleared taxi route. The ATNS has highlighted taxiway "W6" by, for example, superimposing a black line 201 on the image of the taxiway. In addition, the ATNS has displayed the name of the taxiway in the taxi route text box 102. The ATNS has also displayed the names of the logically possible next taxiways in the taxi route. In this example, the logically possible next taxiways are taxiway "WP" and taxiway "V6," as displayed to the right of taxiway/gate buttons 111 and 112. In this example, the crewmember selects taxiway "WP."

Figure 3:
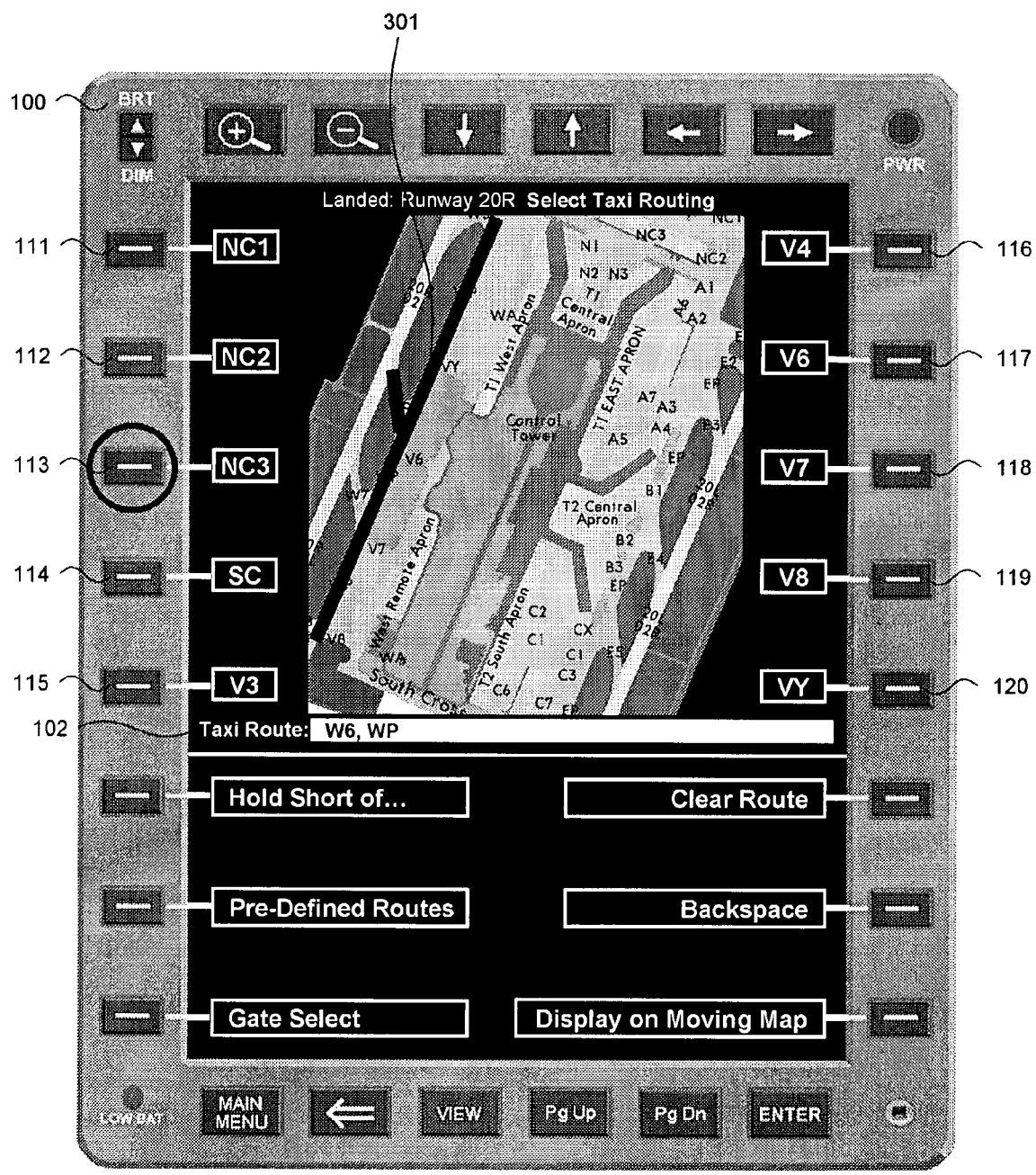
FIG. 3 illustrates the user interface of the ATNS after the crewmember has identified the second taxiway of the cleared taxi route.

FIG. 3 illustrates the user interface of the ATNS after a crewmember has identified the second taxiway of the cleared taxi route. The ATNS has now highlighted taxiway "W6" by, for example, superimposing a black line 301. In this example, the entire taxiway is highlighted because the ATNS does not yet know whether the cleared taxi route will be to the left or right of taxiway "W6." The ATNS has added the name of taxiway "W6" to the taxi route text box 102. The ATNS has also displayed the names of the logically possible next taxiways. For example, the ATNS has displayed the name of taxiway "V4" to the left of taxiway/gate button 116. In this example, the crewmember selects taxiway "NC1" as the next taxiway.

Figure 4:
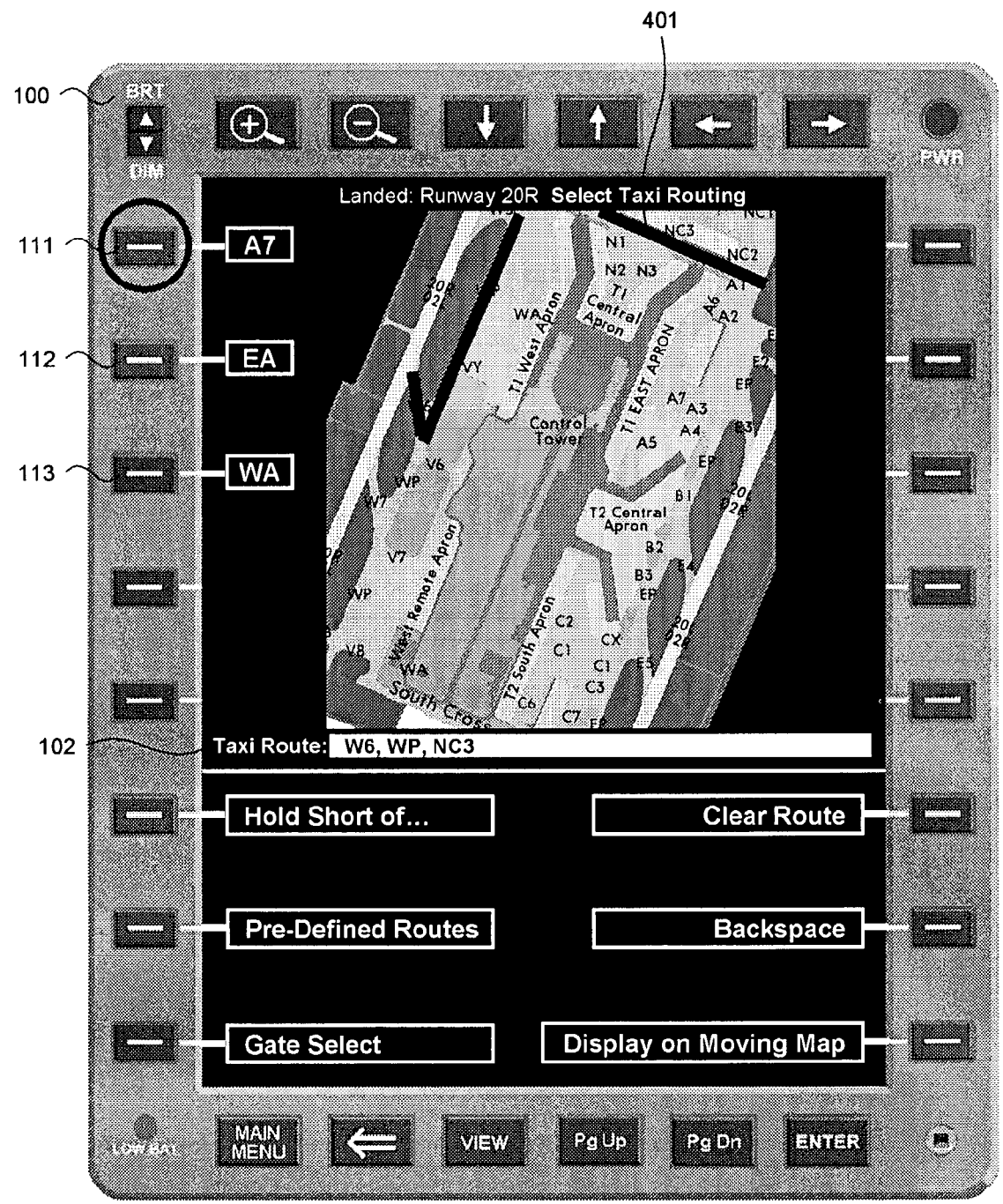
FIG. 4 illustrates the user interface of the ATNS after the crewmember has identified the third taxiway of the cleared taxi route.
Figure 5:
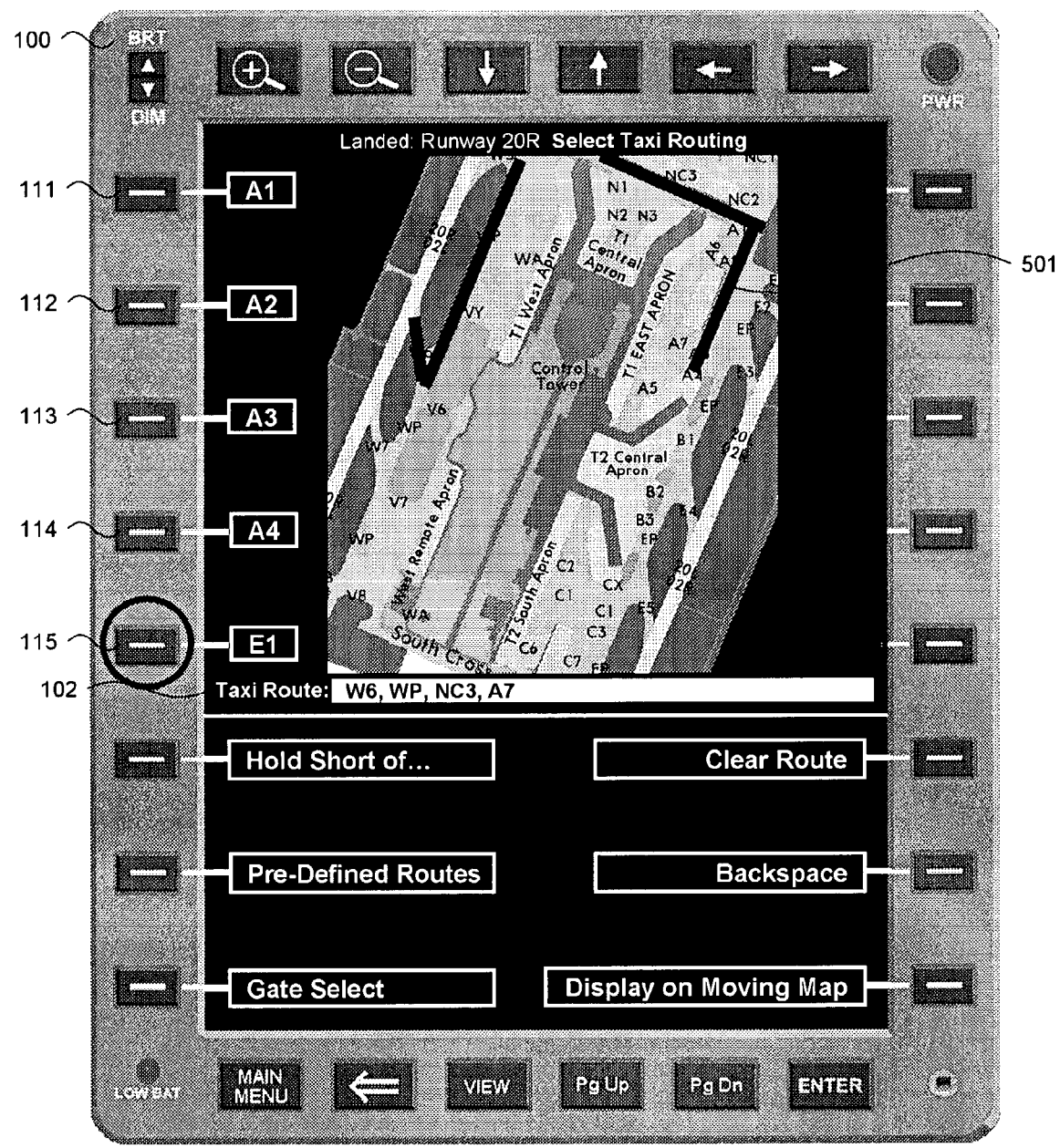
FIGS. 5-8 illustrate user interfaces of the ATNS system as the crewmember identifies the remaining taxiways of the cleared taxi route.
Figure 6:
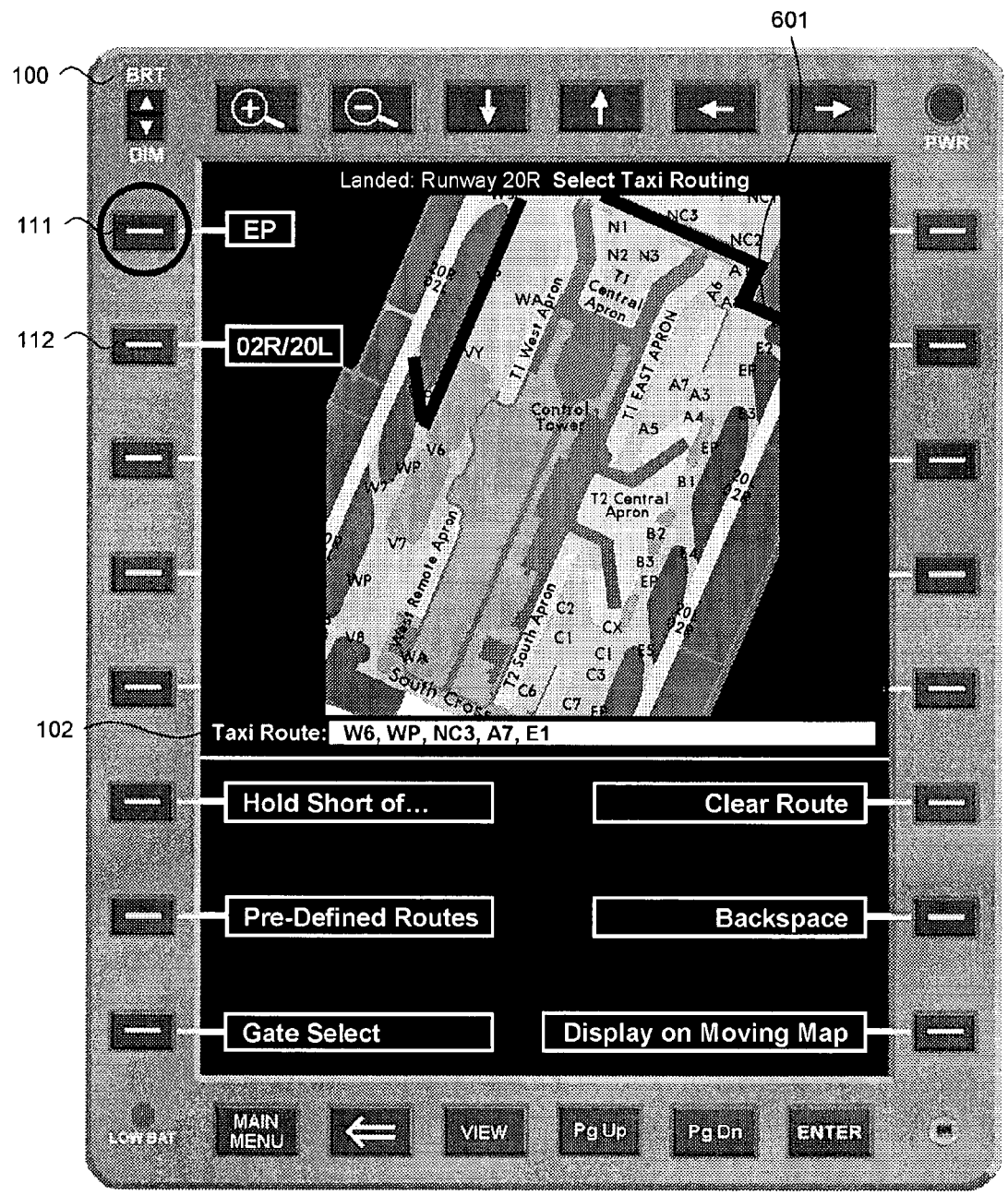
Figure 7:
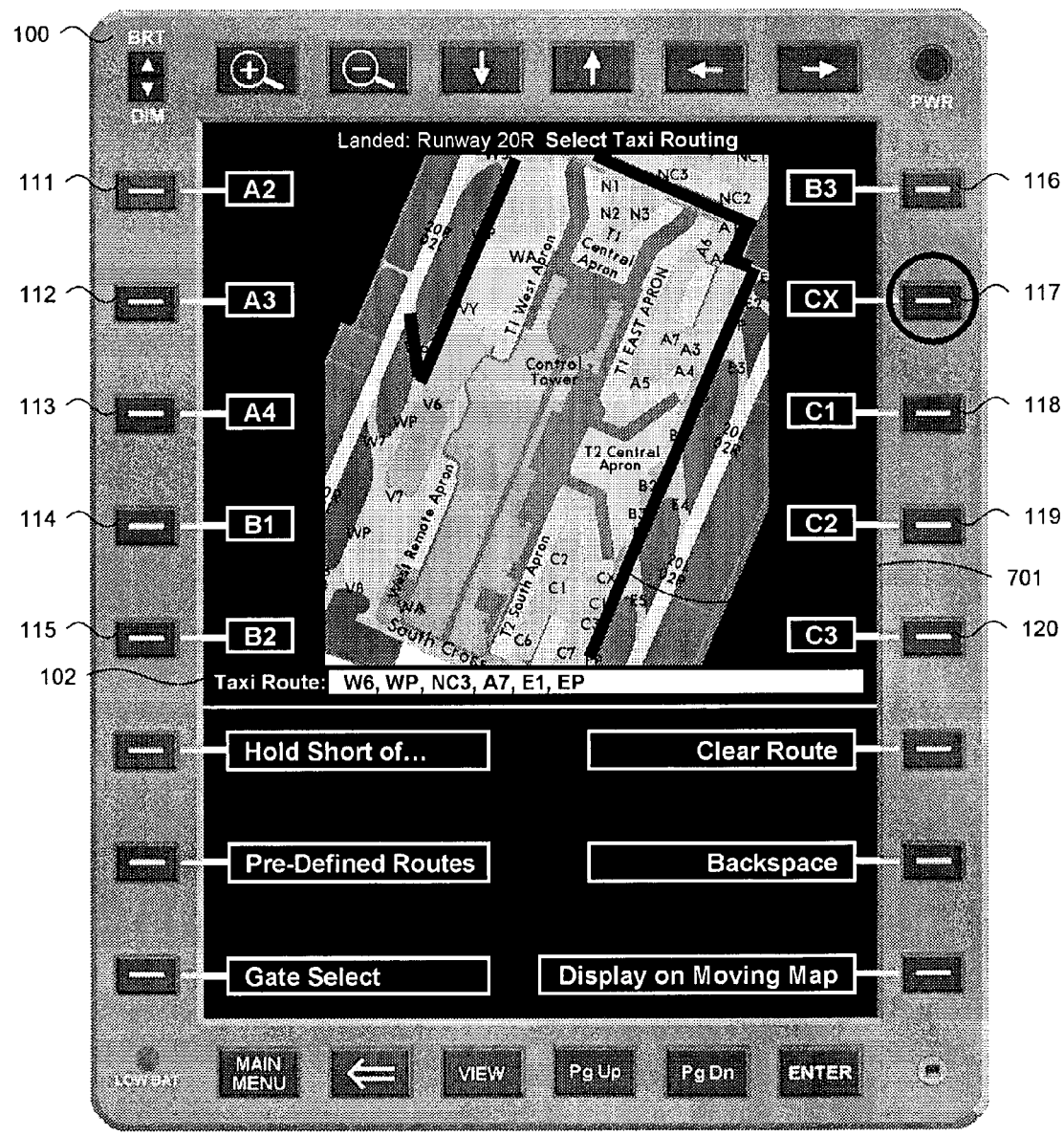

FIG. 4 illustrates the user interface of the ATNS after the crewmember has identified the third taxiway of the cleared taxi route. The ATNS has now highlighted taxiway "NC1" by, for example, superimposing a black line 401. The ATNS has also removed the highlighting for that portion of taxiway "WP" that is not on the cleared taxi route. The ATNS has added the name of taxiway "NC1" to the taxi route text box 102. The ATNS has displayed the names of the next logically possible taxiways adjacent to taxiway/gate buttons 111-113. In this example, the crewmember selects taxiway "A7" as the next taxiway.

Figure 8:
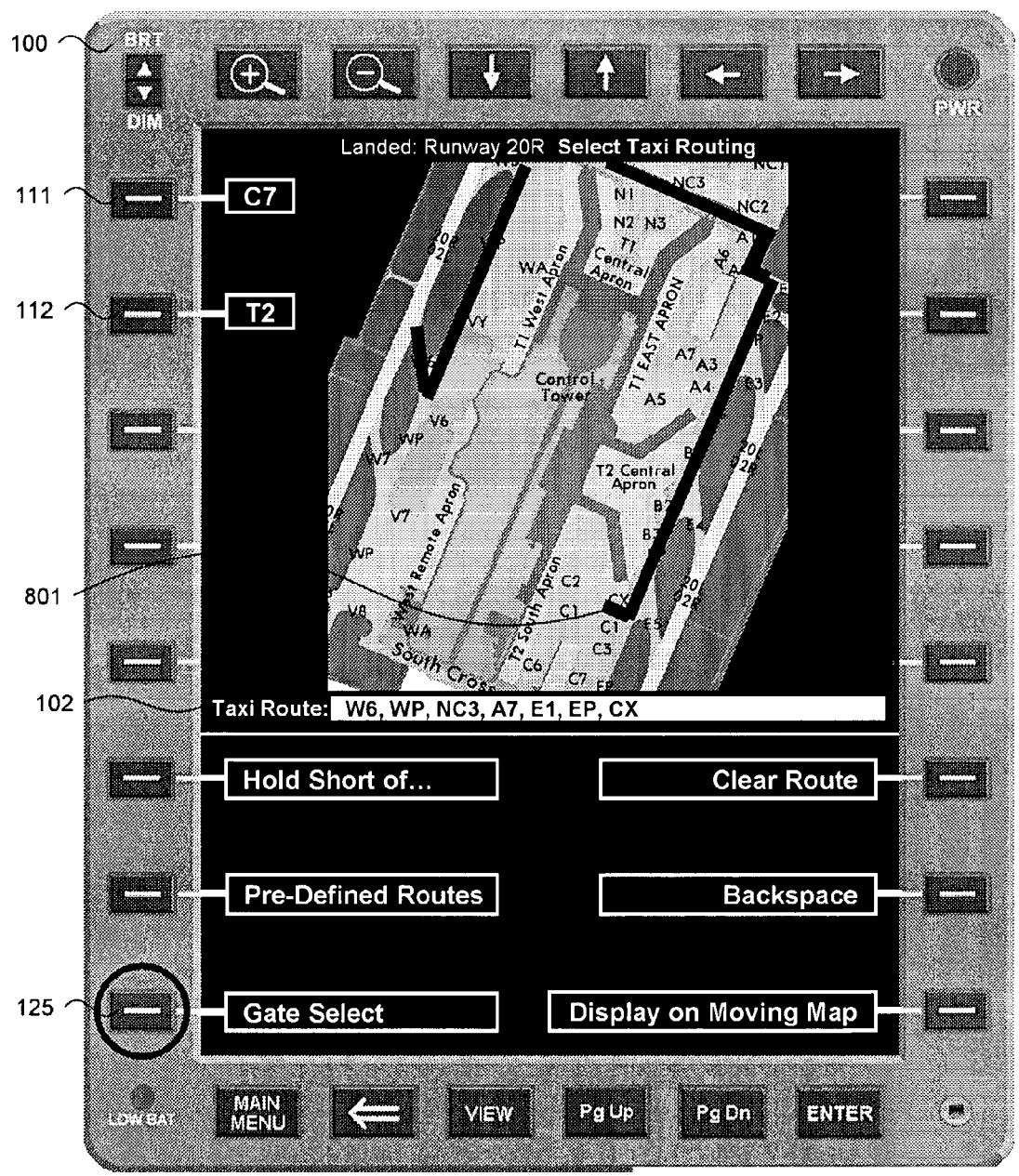

FIGS. 5-8 illustrate user interfaces of the ATNS system as the crewmember identifies the remaining taxiways of the cleared taxi route. The ATNS provides these user interfaces in a manner similar to that illustrated by FIGS. 1-4. The highlighted (e.g., black) line 801 in FIG. 8 represents the complete cleared taxi route. The cleared taxi route comprises taxiways "W6," "WP," "NC1," "A7," "E1," "EP," and "CX," as indicated by the taxi route text box 102. In this example, the crewmember selects menu button 125 to switch from the taxiway input mode to the gate input mode of the ATNS.

Figure 9:
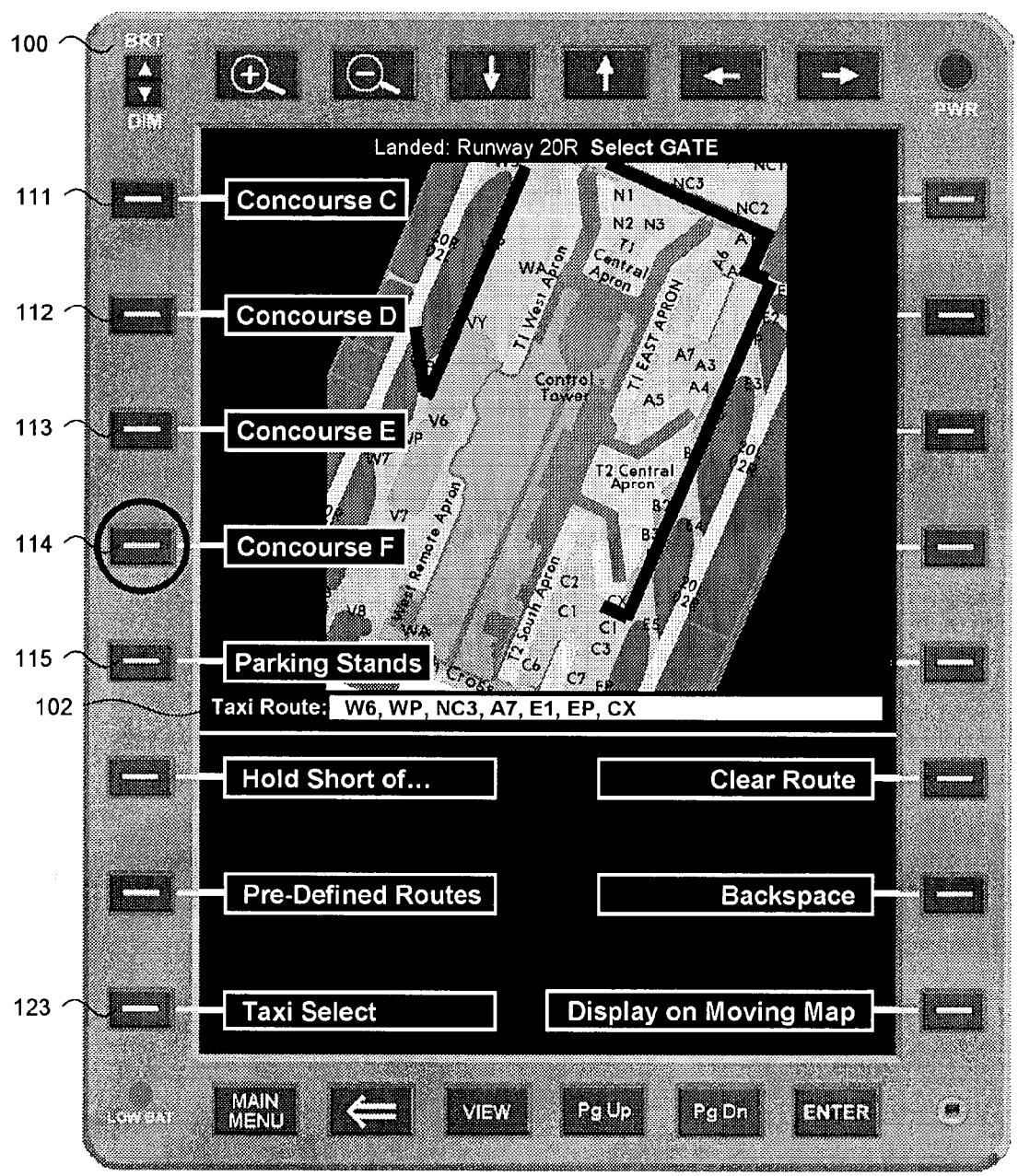
FIG. 9 illustrates the user interface of the ATNS in gate input mode.

FIG. 9 illustrates the user interface of the ATNS in gate input mode. The ATNS displays the names of the concourses adjacent to taxiway/gate buttons 111-115. For example, taxiway/gate button 111 corresponds to concourse "C." The function of menu button 123 has changed to enter taxi route input mode. This button allows the ATNS to toggle between taxi route input mode and gate input mode. In this example, the crewmember selects taxiway/gate button 114 corresponding to concourse "F."

Figure 10:
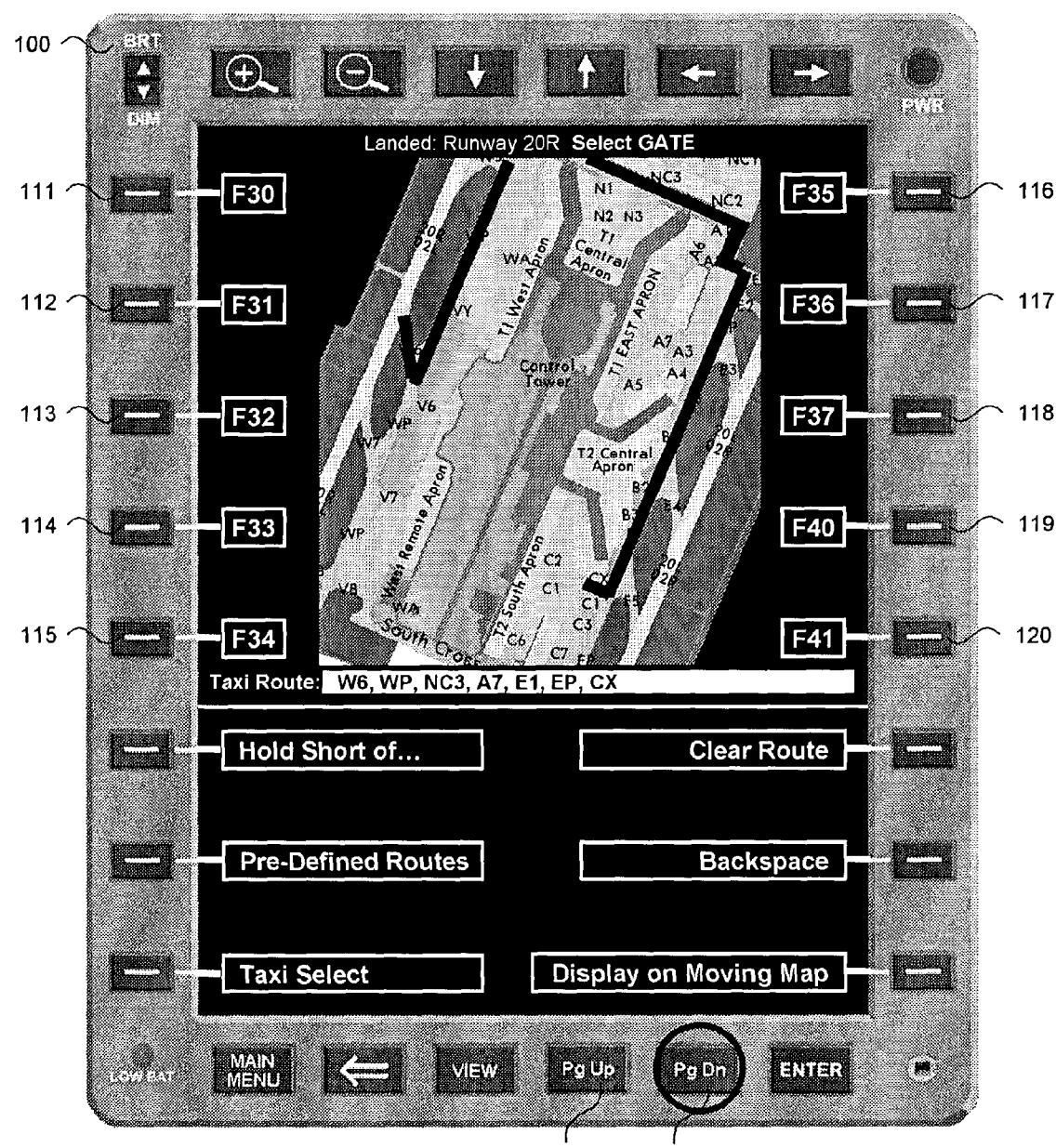
FIG. 10 illustrates the user interface of the ATNS after the crewmember has selected destination concourse.

FIG. 10 illustrates the user interface of the ATNS after the crewmember has selected the destination concourse "F". The ATNS displays the names of the gates of the selected concourse adjacent to taxiway/gate buttons 111-120. In this example, concourse "F" has more than 10 gates. Thus, the crewmember uses the page up button 143 and the page down button 144 to page through the list of gates. Although not highlighted in this example, the ATNS may also highlight the selected concourse on the map.

Figure 11:
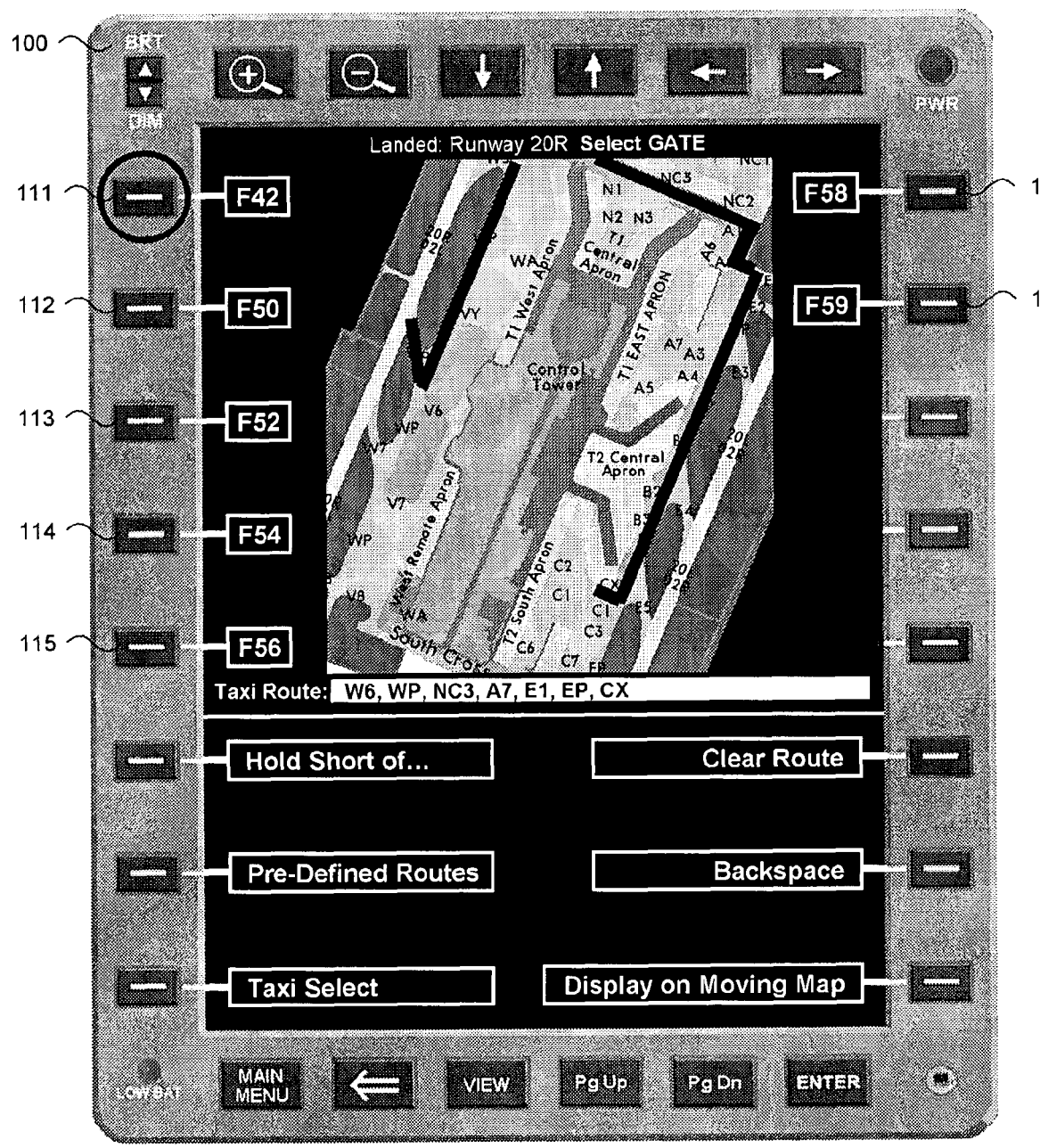
FIG. 11 illustrates the user interface of the ATNS after the crewmember has paged to desired destination gate.

FIG. 11 illustrates the user interface of the ATNS after the crewmember has paged to the desired gate. In this example, the crewmember selects gate "F42."

Figure 12:
FIG. 12 illustrates the user interface of the ATNS after the crewmember has selected the destination gate.

FIG. 12 illustrates the user interface of the ATNS after the crewmember has selected the destination gate. The ATNS indicates the destination gate by highlight 1201. The crewmember may then select the display on moving map button 126 to switch to a dynamic mode. The ATNS may automatically enter an airplane tracking mode. One skilled in the art will appreciate that the ATNS may be in airplane tracking mode concurrently with other modes to show the current position and heading of the airplane even before or during entry of the cleared taxi route.

Figure 13:
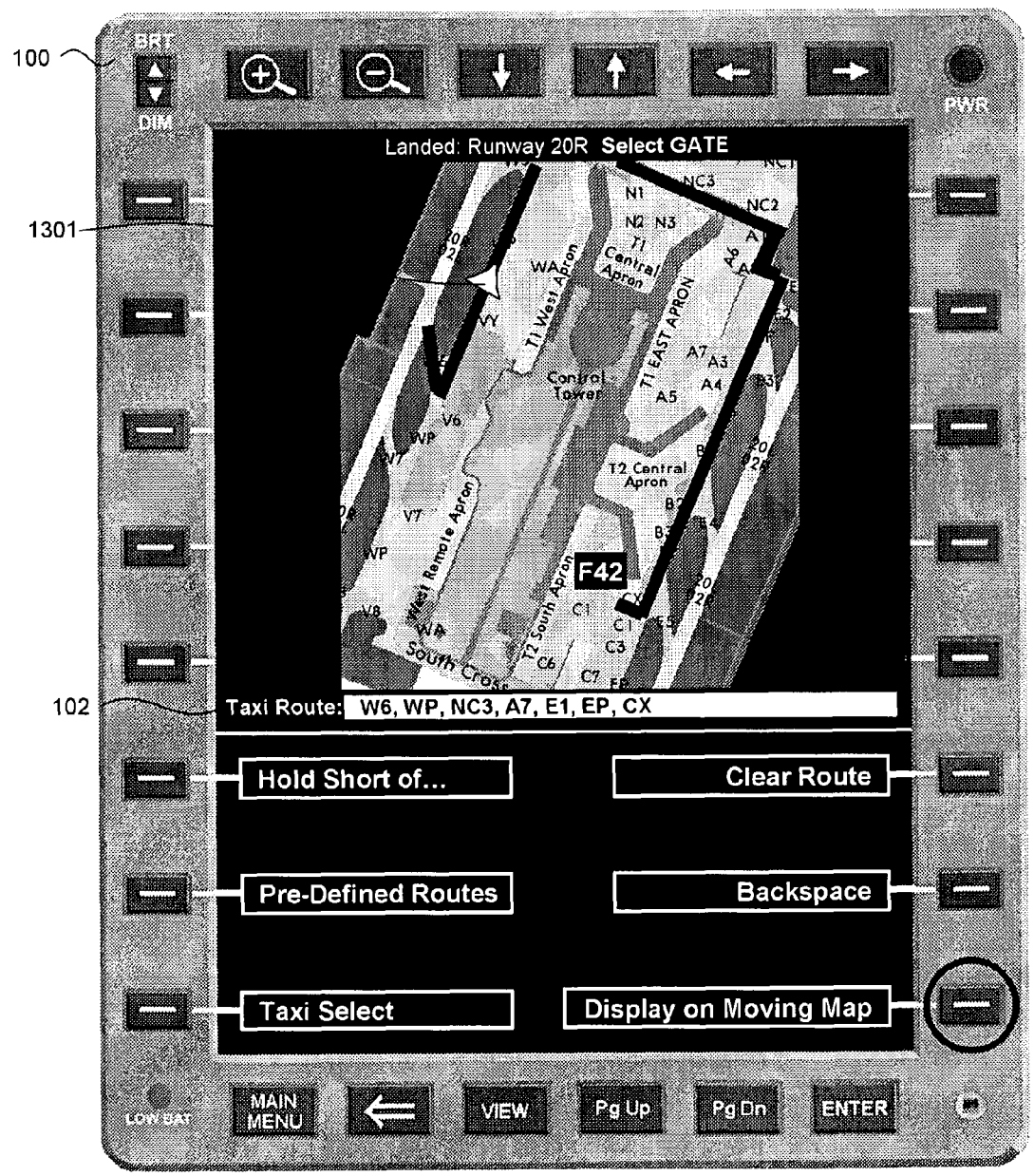
FIGS. 13-15 illustrate the user interface of the ATNS showing the position and heading of the airplane as it taxis.
Figure 14:
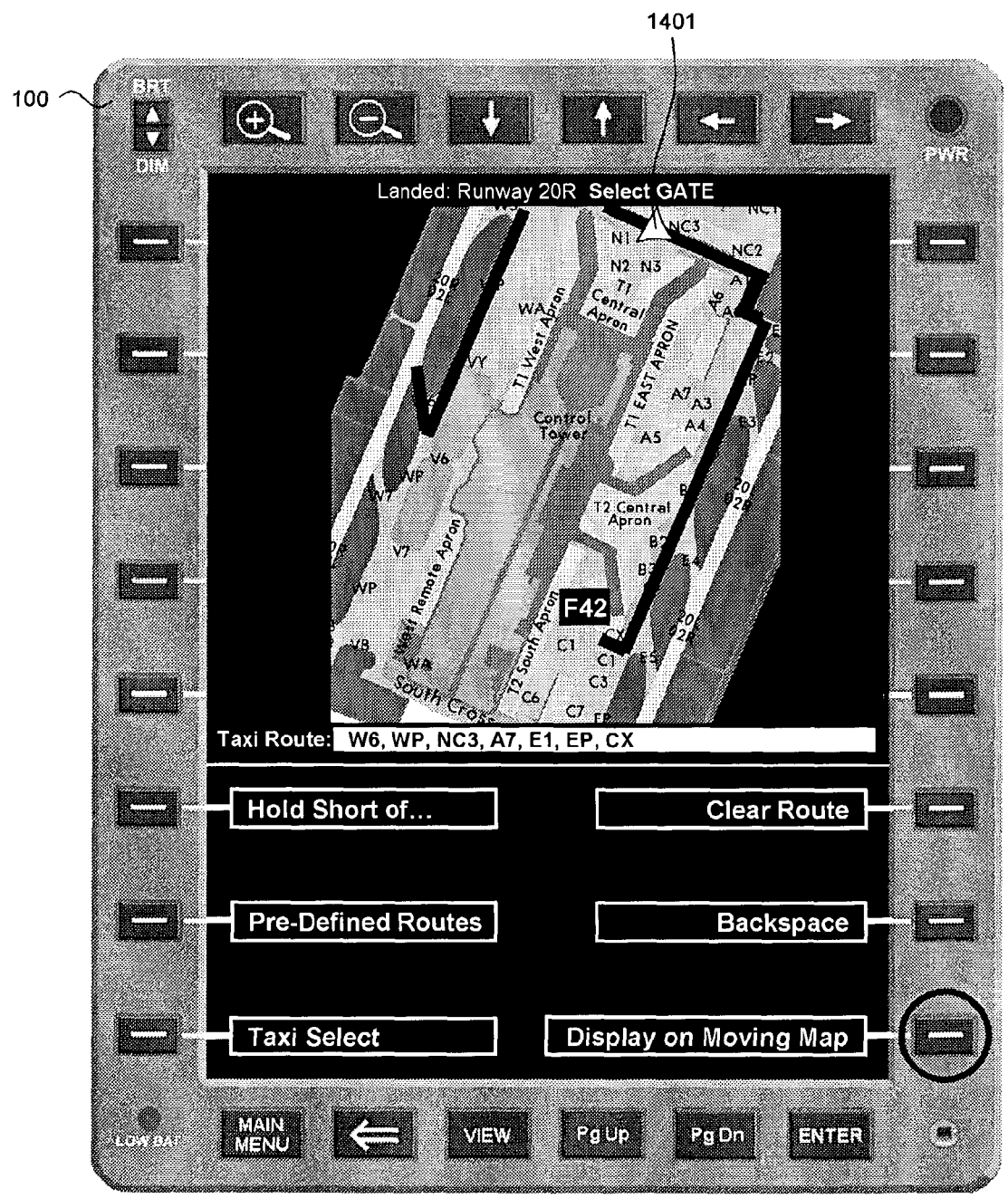
Figure 15:
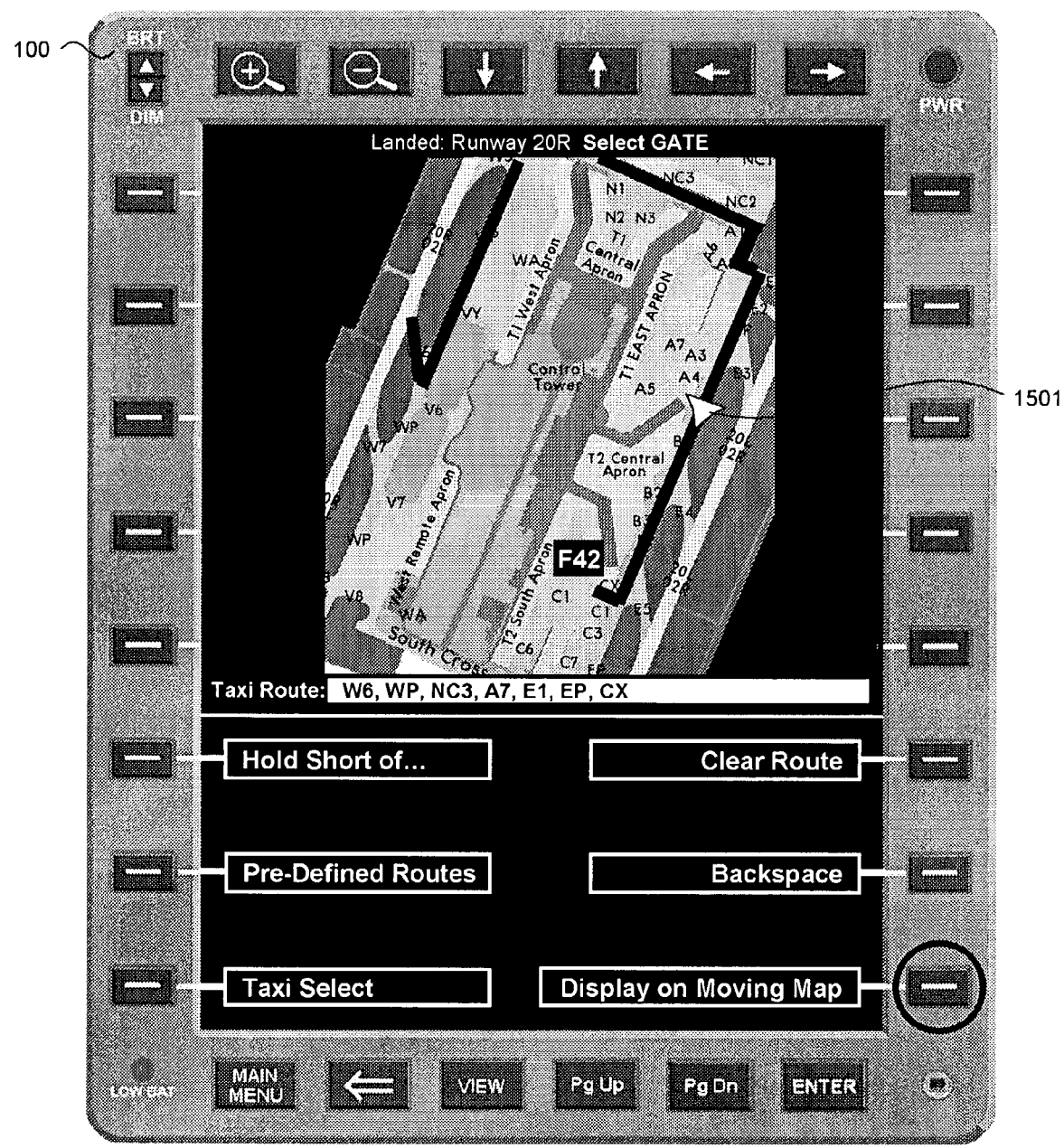

FIGS. 13-15 illustrate the user interface of the ATNS showing the position and heading of the airplane as it taxis. In FIG. 13 a triangle 1301 indicates the position and heading of the airplane. In an alternate embodiment, an image of an airplane may be displayed instead of a triangle. As discussed above, the displayed position and heading of the airplane may be estimated to help smooth the transition from one position and heading reading to the next position and heading reading. Although not illustrated, the ATNS may highlight the names of the taxiways in the taxi route text box 102 as the airplane enters each taxiway to show progress through the cleared taxi route. As the airplane taxis, the ATNS may provide visual and audio notifications of alert conditions, such as nearing the edge of a taxiway, entering a wrong taxiway, or approaching a holdshort line.

Figure 15A:
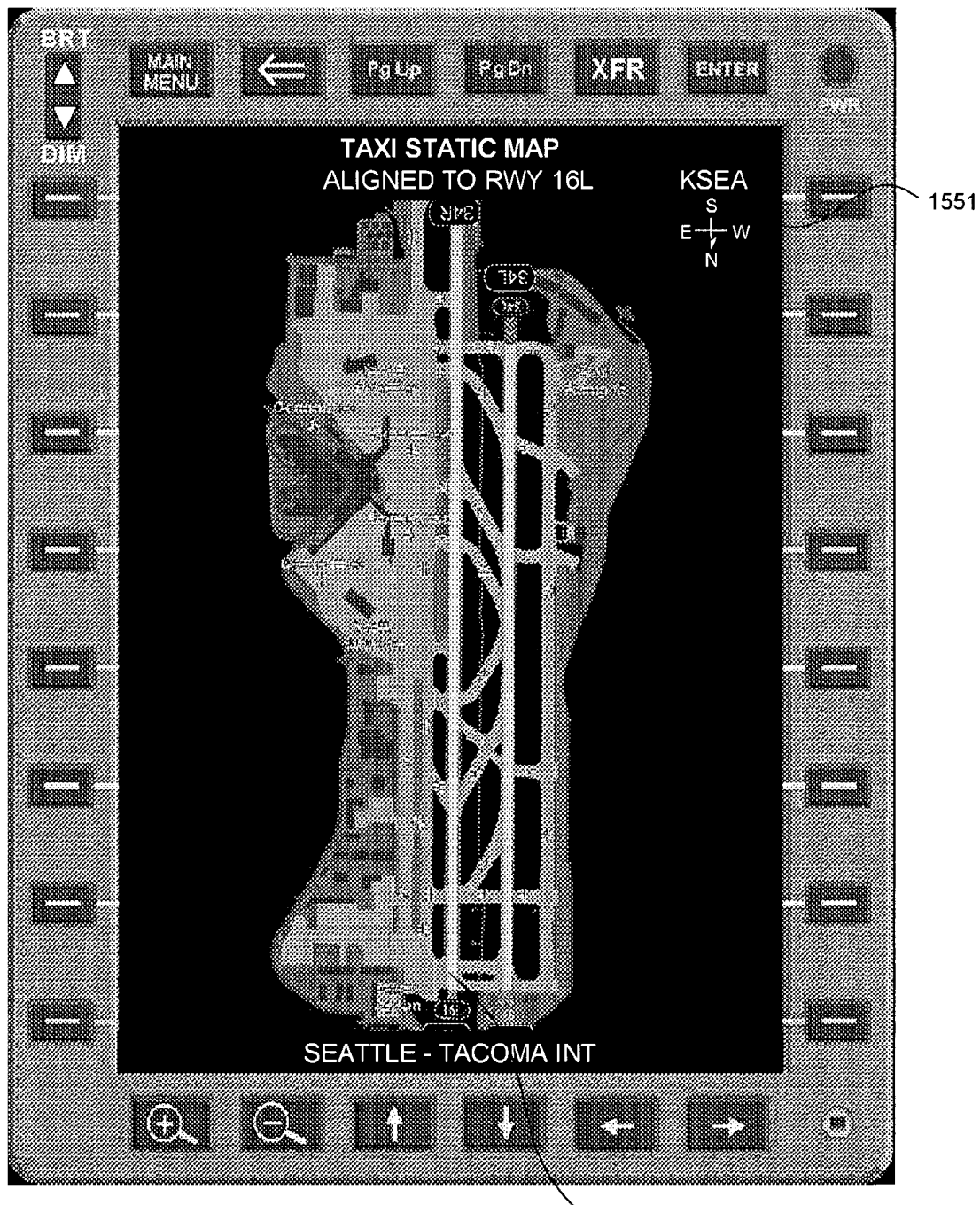
FIG. 15A illustrates the user interface of the ATNS when an airport map is displayed in the align-to-runway mode.

FIG. 15A illustrates the user interface of the ATNS when an airport map is displayed in the align-to-runway mode. In this example, the airplane is on approach to runway 16L. The ATNS displays runway 16L 1550 vertically and centered horizontally on the display. The compass 1551 indicates that the airplane is approaching from the north. When the airplane lands, for example, as detected by WOW, the ATNS may automatically switch to heading up mode.

Figure 15B:
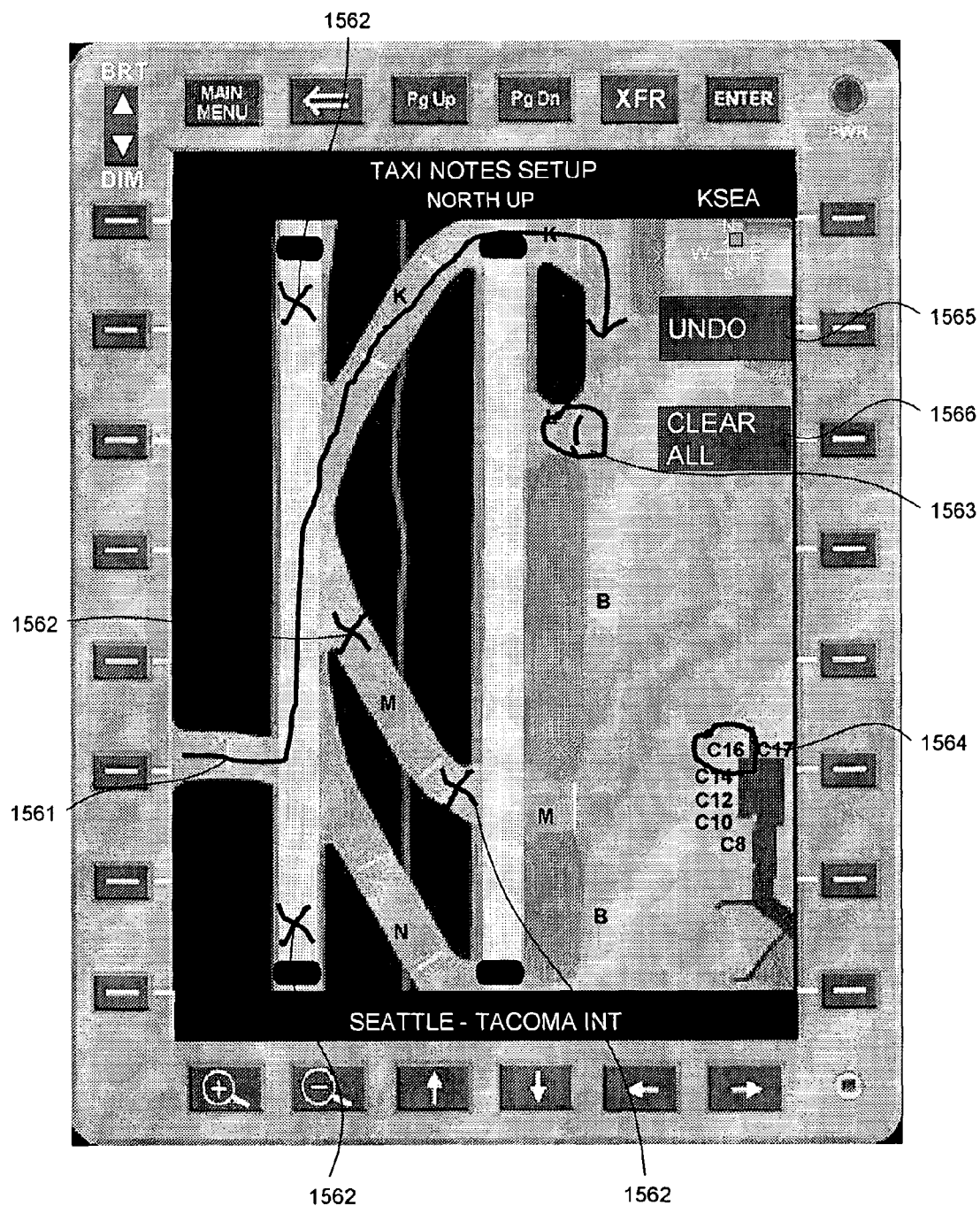
FIG. 15B illustrates the user interface of the ATNS with annotations displayed.

FIG. 15B illustrates the user interface of the ATNS with annotations displayed. In this example, a crewmember has selected the freehand drawing mode and annotated portions of the cleared taxi route. The line 1561 indicates the cleared taxi route. The "Xs" 1562 indicate taxiways or portions of taxiways not on the cleared taxi route. The exclamation point with the circle 1563 indicates an area of concern noted by a crewmember. For example, the area of concern may indicate that a construction project is in progress near that position. The circle 1564 indicates the destination gate. The "undo" button 1565 allows a crewmember to remove the freehand drawing segment (e.g., a circle) or other annotation that was last placed on the map. The "clear all" button 1566 allows a crewmember to remove all the annotations from the map.

Figure 16:
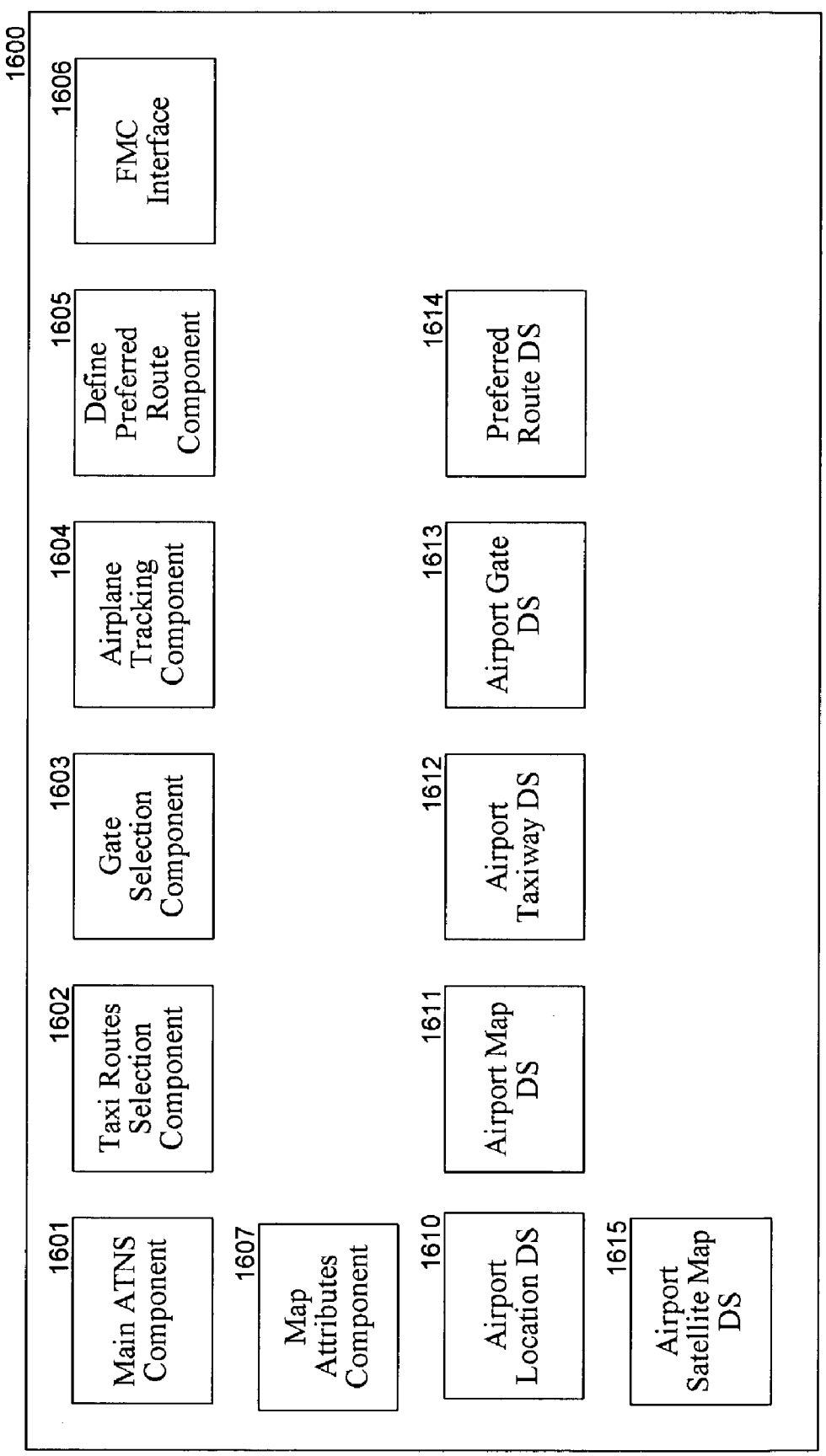
FIG. 16 is a block diagram illustrating components of the ATNS in one embodiment.

FIG. 16 is a block diagram illustrating components of the ATNS in one embodiment. The ATNS may include software components such as a main ATNS component 1601, a taxi route selection component 1602, a gate selection component 1603, an airplane tracking component 1604, a define preferred route component 1605, a flight management control interface 1606, and a map attributes component 1607. In addition, the ATNS may include various data stores such as an airport location data store 1610, an airport map data store 1611, an airport taxiway data store 1612, an airport gate data store 1613, a preferred route data store 1614, and an airport satellite map data store 1615. The data stores may be implemented using files and databases and may contain various data structures. The main ATNS component provides for initialization of the ATNS and selection of the various modes of the ATNS. The taxi route selection component controls the input of the cleared taxi route by a crewmember. The gate selection component controls the input of the destination gate by a crewmember. The airplane tracking component periodically retrieves position and heading information from the AASB and displays an indication of the current position and heading of the airplane. The airplane tracking component may provide various alerts, such as when the airplane is getting near the edge of a taxiway or near another airplane (assuming it has access to the position information of other airplanes). The define preferred route component allows a crewmember to define new preferred taxi routes. The flight management control interface provides access to flight management information, such as position and heading. The flight management control interface may also provide access to taxiing information (e.g., cleared taxi route) provided by the ground control computer system to the flight management control system of the airplane. The map attribute component is used to control various attributes of the map, such as selection of static or dynamic modes, selection of a satellite view mode, and zooming and scrolling of the map. In satellite view mode, the ATNS displays a satellite image of the airport to help orient the crewmembers. The airport location data store contains a list of supported airports along with location information for each airport. The ATNS may use this information to identify the landing or takeoff airport. The airport map data store contains a map of each supported airport. Each map may be stored as vectors describing the boundaries of the runways, taxiways, concourses, and so on, of each airport. The airport taxiway data store identifies the name of each taxiway and other ways of the corresponding airport and may include additional information, such as the logically possible next taxiways for each taxiway. The airport taxiway store contains a mapping of taxiway names to corresponding information in the airport map data store. The airport taxiway data store may also include information describing holdshort lines and identifying major and minor taxiways. In one embodiment, the ATNS allows a crewmember to input only the major taxiways of the cleared taxi route and automatically identifies the corresponding minor taxiways. The airport gate data store identifies the name of the concourses and gates of the airport along with a mapping to the corresponding information in the airport map data store. The preferred route data store contains the currently define preferred routes for each airport. The airport satellite map data store contains a satellite image of the supported airports.

The ATNS software may execute on an onboard ATNS computer that includes a central processing unit, memory, input devices (e.g., pointing device, touch-panel display, and physical buttons), output devices (e.g., display devices and speakers), and storage devices (e.g., flash EPROM and disk drives). The memory and storage devices are computer-readable media that may contain instructions and data structures that implement the ATNS. The ATNS computer may be connected to other onboard devices (e.g., the flight management computer) via a bus or point-to-point connection to retrieve information (e.g., position and heading) from and provide information (e.g., destination gate) to other devices (e.g., printer). Since the ATNS is typically only used when taxiing before takeoff or after landing, the ATNS may be one of several applications that are available on the ATNS computer for use during flight or while not taxiing. Alternatively, the ATNS computer may not even be an installed onboard computer connected to other devices but may, for example, be a stand-alone laptop computer located in the cockpit. In such a case, the laptop computer may have a global positioning device. One skilled in the art will appreciate that the function of the ATNS may be provided by a computer that is remote from the airplane. For example, a ground control computer executing the ATNS may generate and send data about the airport, cleared taxi route, and airplane position to be displayed on an onboard monitor. The display images provided by such a ground control computer may also show positions of other airplanes.

Figure 17:
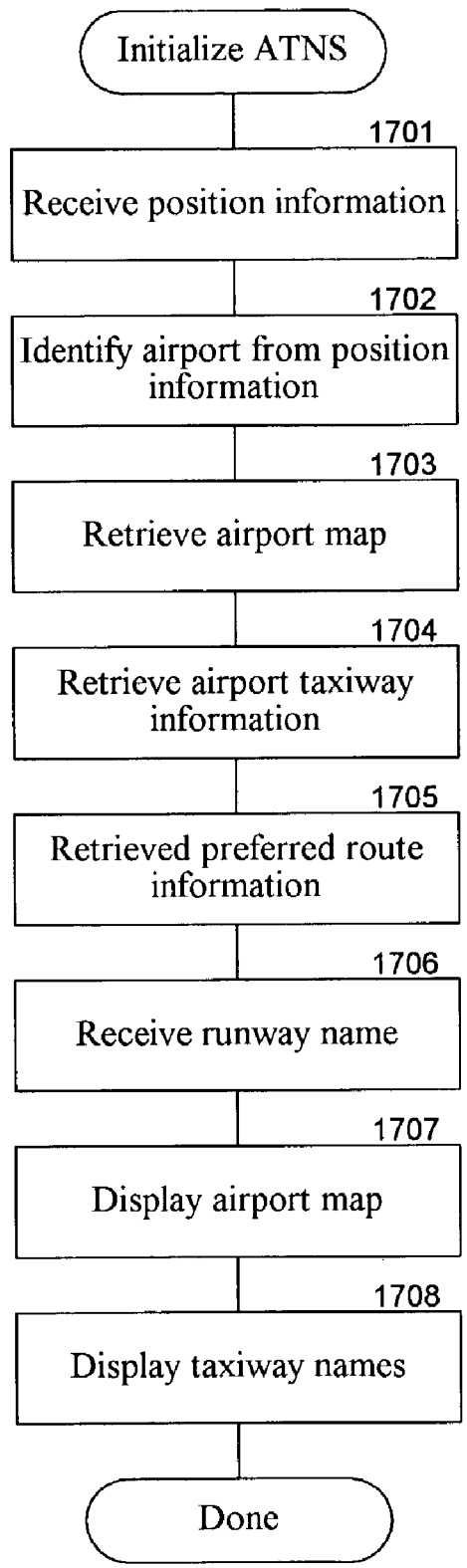
FIG. 17 is a flow diagram illustrating the processing of an initialize ATNS component.

FIGS. 17-23 are flow diagrams that illustrate the processing of the components of the ATNS in one embodiment. The flow diagrams illustrate the overall function of the ATNS. One skilled in the art will appreciate, however, that the functions may be implemented in many different ways, and the components and data stores can be organized in many different ways. FIG. 17 is a flow diagram that illustrates the processing of an initialize ATNS component. This component may be a subcomponent of the main ATNS component. This component identifies the airport (i.e., landing or takeoff) and displays the initial user interface for input of the cleared taxi route. In block 1701, the component receives position, speed, and heading information from the AASB. In block 1702, the component identifies the airport based on comparison of the position information and the location information in the airport location data store. Alternatively, the component may retrieve the identity of the airport from the AASB or receive it from a crewmember. In block 1703, the component retrieves the airport map for the airport from the airport map data store. In block 1704, the component retrieves the taxiway information for the airport from the airport taxiway data store. In block 1705, the component retrieves the preferred taxi routes from the preferred route data store for the selected airport. In block 1706, the component receives an identification of the runway. In one embodiment, a crewmember may input the runway identification. Alternatively, it may be retrieved from the AASB. In block 1707, the component displays the airport map. In block 1708, the component displays the names of the logically possible next taxiways adjacent to the taxiway/gate buttons and then completes.

Figure 18:
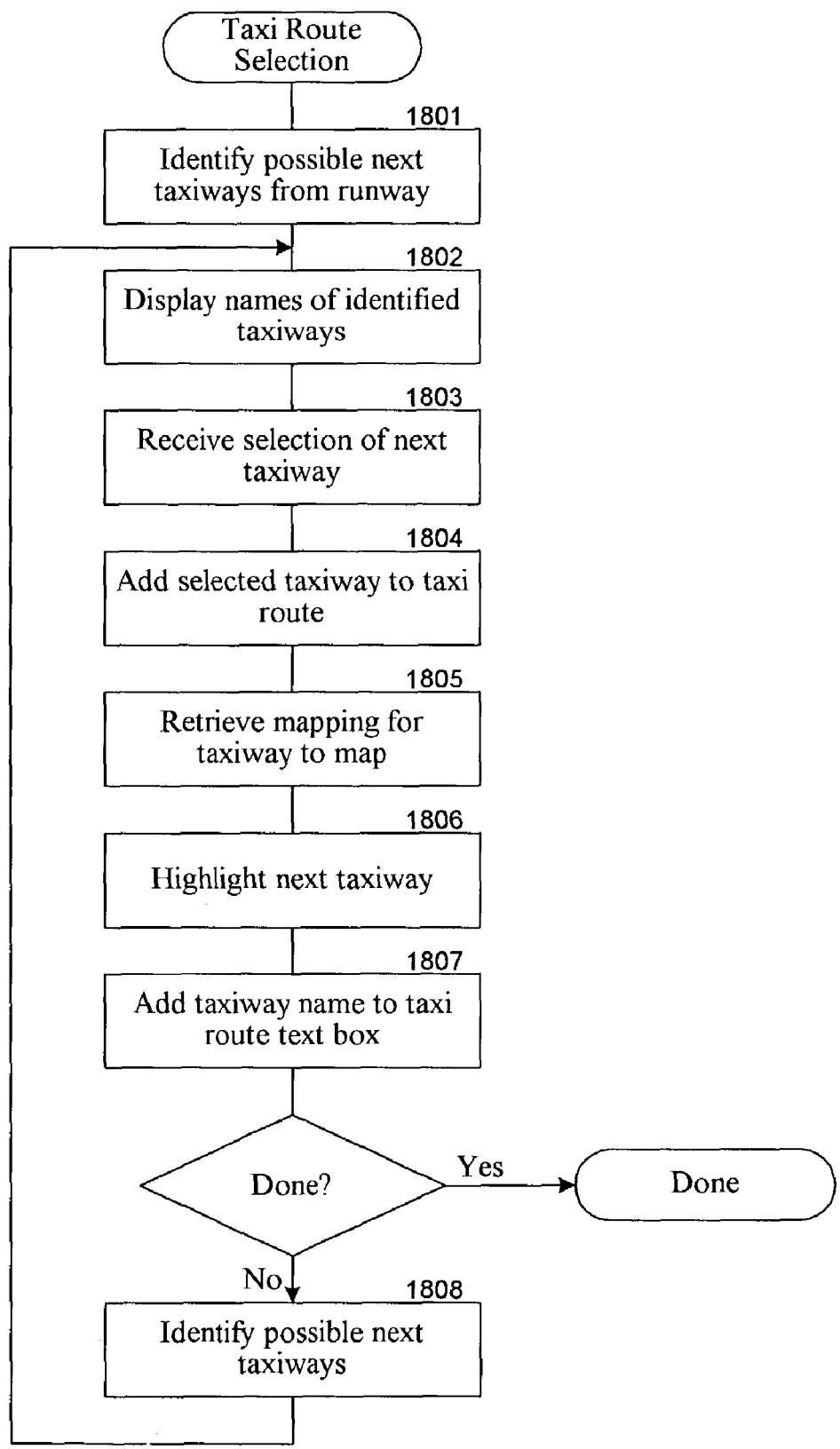
FIG. 18 is a flow diagram illustrating the processing of the taxi route selection component of the ATNS.

FIG. 18 is a flow diagram that illustrates the processing of the taxi route selection component of the ATNS when an airplane lands. The taxi route selection component controls the entry of the taxiways of the cleared taxi route by a crewmember. In block 1801, the component identifies the logically possible next taxiways for the landing runway based on the information in the airport taxiway data store. The component may alternatively give the crewmember an option to select any one of the taxiways at the airport. In blocks 1802-1809, the component loops, allowing the crewmember to input the next taxiway of the cleared taxi route. In block 1802, the component displays the names of the logically possible next taxiways adjacent to the taxiway/gate buttons. Although not shown by this flow diagram, the component may allow the crewmember to page through the list of taxiways. In block 1803, the component receives the selection of the next taxiway from a crewmember. In block 1804, the component adds the selected taxiway to the taxi route. In block 1805, the component retrieves a mapping for the selected taxiway to the displayed map. In block 1806, the component uses the retrieved mapping to highlight the next taxiway of the taxi route. In block 1807, the component adds the name of the selected taxiway to the taxi route text box. In decision block

1808, if all the taxiways of the taxi route have already been selected, then the component completes, else the component continues at block 1809. In block 1809, the component identifies the logically possible next taxiways for the last selected taxiway and then loops to block 1802 to allow a crewmember to select the next taxiway.

Figure 19:
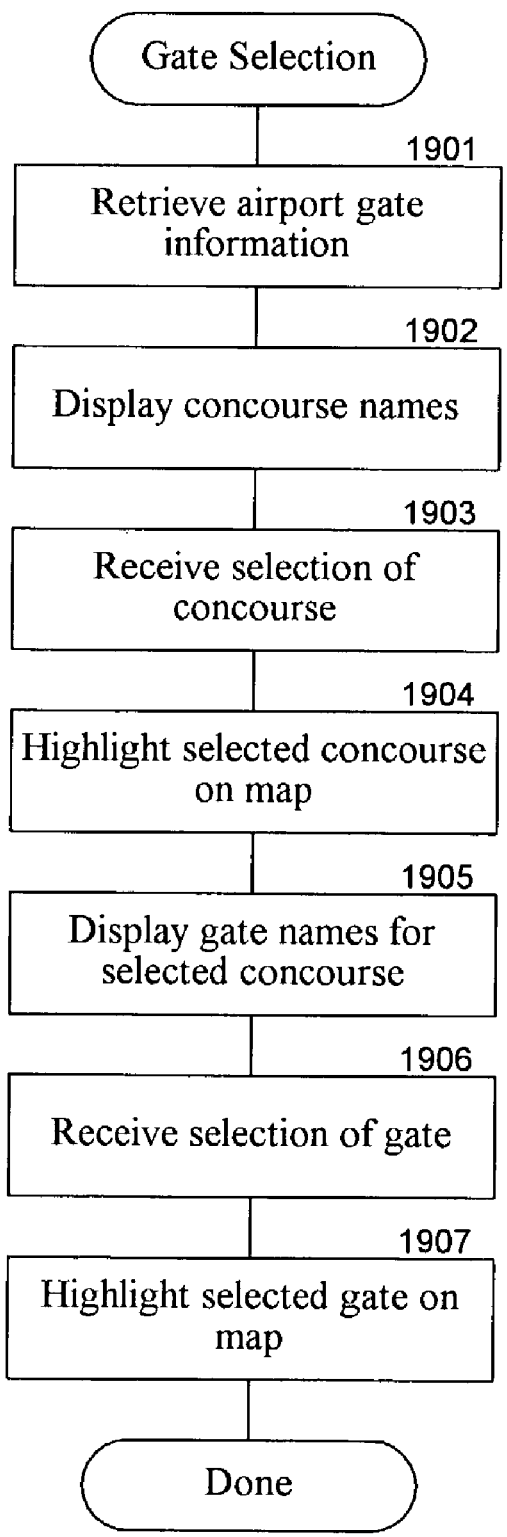
FIG. 19 is a flow diagram illustrating the processing of the gate selection component of the ATNS.

FIG. 19 is a flow diagram that illustrates the processing of the gate selection component of the ATNS when landing. The gate selection component allows a crewmember to designate the destination gate. In block 1901, the component retrieves the gate information for the airport from the airport gate data store. In block 1902, the component displays the concourse names adjacent to the taxiway/gate buttons. In block 1903, the component receives the selection of a concourse from a crewmember. In block 1904, the component highlights the selected concourse on the map. In block 1905, the component displays the names of the gates for the selected concourse adjacent to the taxiway/gate buttons. In block 1906, the component receives the selection of the destination gate from a crewmember. In block 1907, the component highlights the selected gate on the map and then completes.

Figure 20:
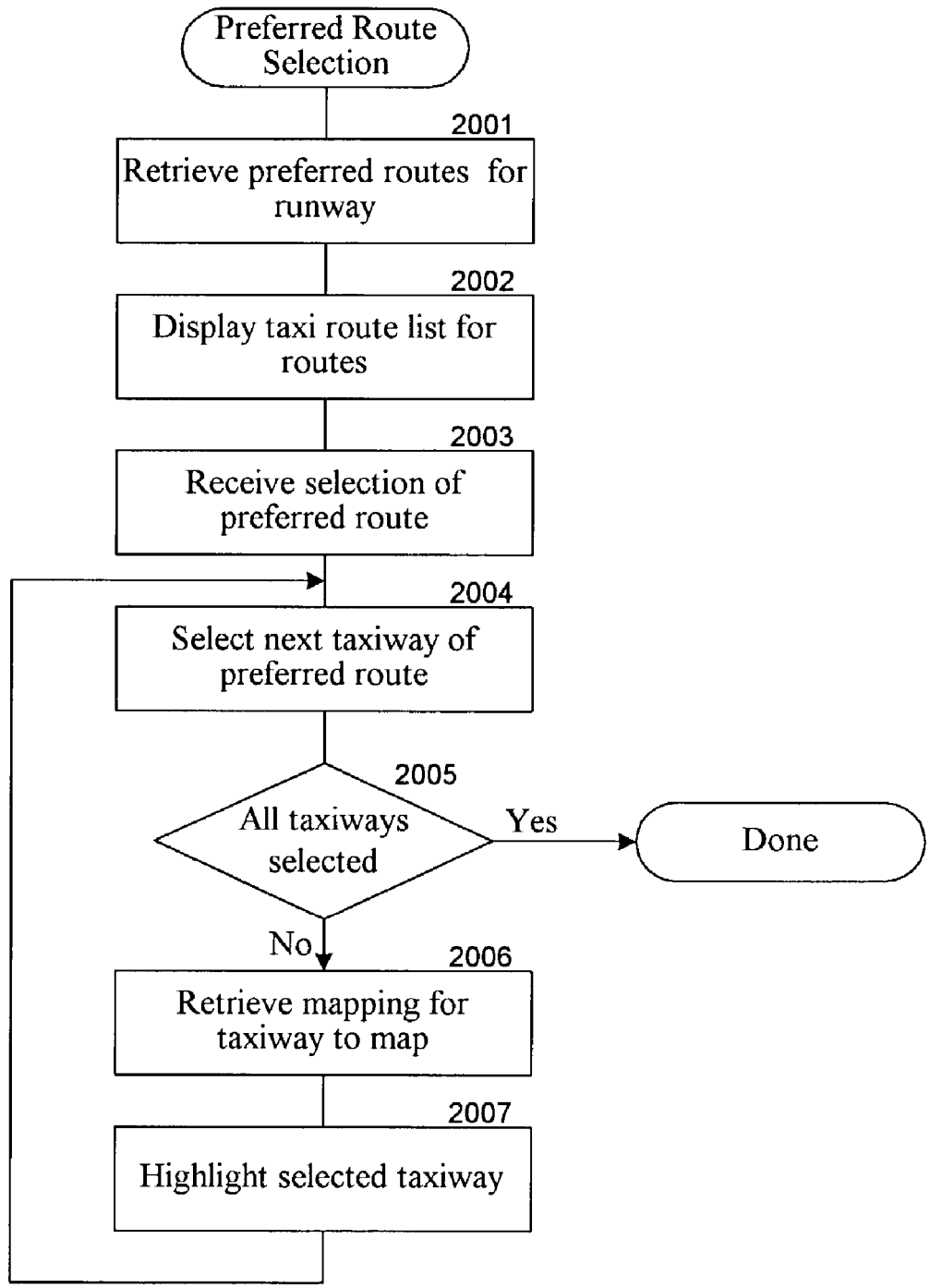
FIG. 20 is a flow diagram illustrating the processing of the preferred route selection component of the ATNS.

FIG. 20 is a flow diagram that illustrates the processing of the preferred route selection component of the ATNS. This component allows a crewmember to select a preferred taxi route as the cleared taxi route. In block 2001, the component retrieves the preferred taxi routes for the landing runway of the landing airport (or for the departing gate when taking off). In block 2002, the component displays a list of the preferred taxi routes. In block 2003, the component receives the selection of a preferred taxi route from a crewmember. In blocks 2004-2007, the component loops, highlighting each taxiway of the preferred taxi route. In block 2004, the component selects the next taxiway of the preferred taxi route. In decision block 2005, if all the taxiways of the preferred taxi route have already been selected, then the component completes, else the component continues at block 2006. In block 2006, the component retrieves a mapping for the selected taxiway to the airport map. In block 2007, the component highlights the selected taxiway and loops to block 2004 to select the next taxiway of the selected preferred taxi route.

Figure 21:
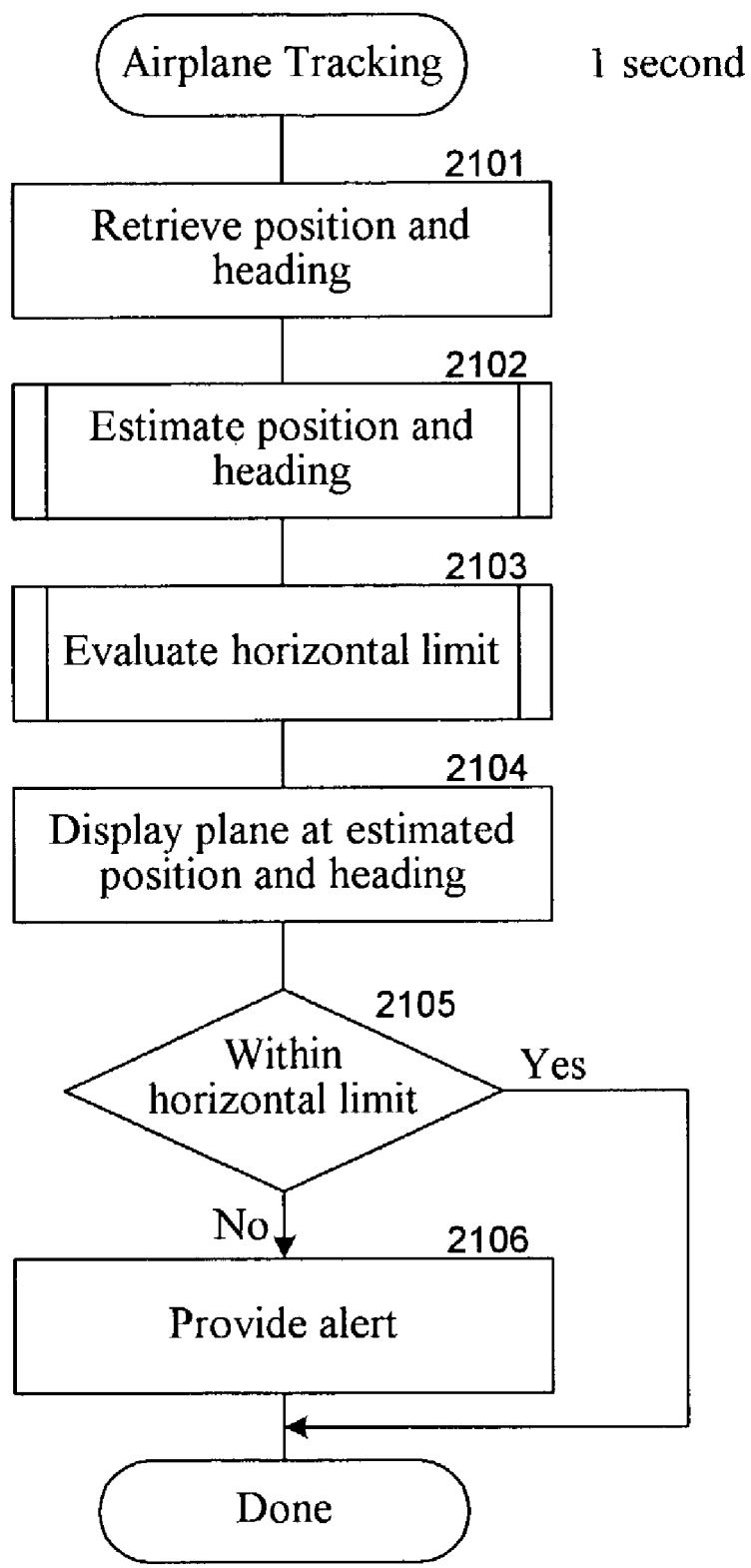
FIG. 21 is a flow diagram of the airplane tracking component of the ATNS.

FIG. 21 is a flow diagram of the airplane tracking component of the ATNS. This component may be automatically executed periodically (e.g., every one-tenth of a second) to indicate the new position of the airplane. Since the position and heading information of the AASB may be updated less frequently, this component estimates the position and heading information in between AASB readings. In block 2101, the component retrieves the position and heading information from the AASB. In block 2102, the component invokes a component to estimate the current position and heading. In block 2103, the component invokes a component to evaluate the horizontal limit of the current taxiway. In block 2104, the component displays an indication of the airplane at the estimated position and heading. In decision block 2105, if the airplane is not within the horizontal limit, then the component outputs an alert in block 2106 before completing.

Figure 22:
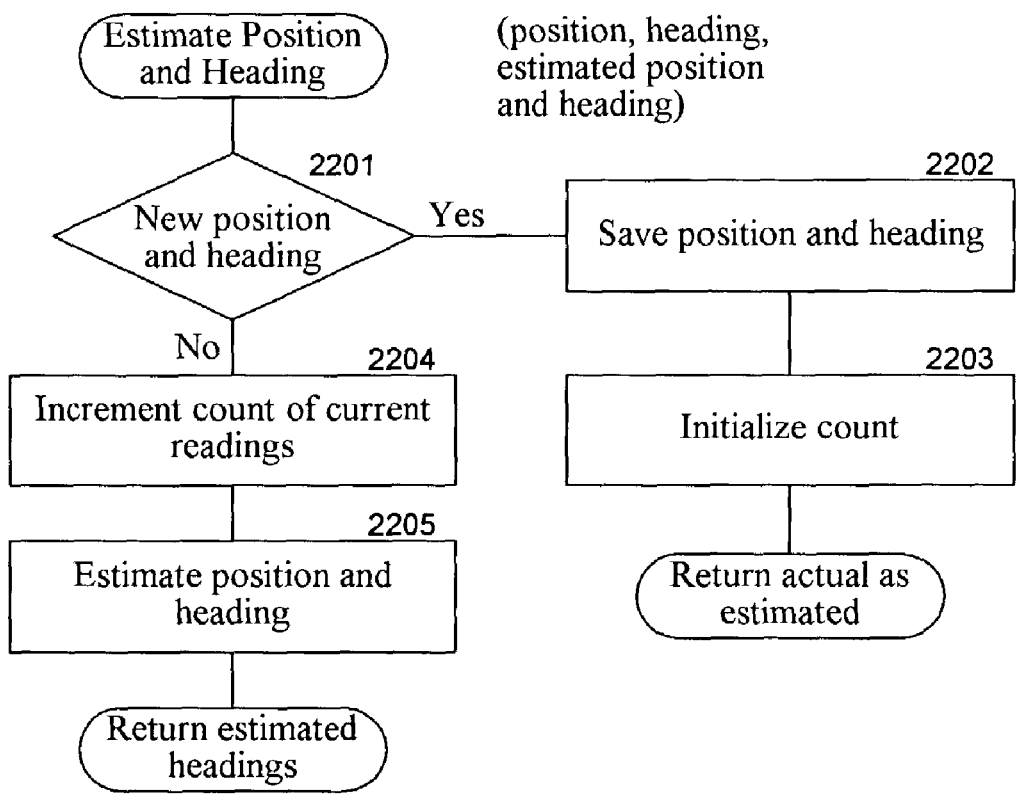
FIG. 22 is a flow diagram illustrating the processing of the estimate position and heading component of the ATNS.

FIG. 22 is a flow diagram that illustrates the processing of the estimate position and heading component of the ATNS. This component may be passed the last retrieved heading and position information and estimates the current position and heading of the airplane. In decision block 2201, if the retrieved position and heading information is different from the last retrieved position and heading information, then new information is available and the component continues at block 2202, else the component continues at block 2204. In block 2202, the component saves the retrieved position and heading information. In block 2203, the component initializes a timer to indicate the time since the last new position and heading information was retrieved. This timer is used to estimate the position and heading. The component then returns the new position and heading information as the estimated heading and position information. In block 2204, the component increments the time since the last new position and heading information was received. In block 2205, the component estimates the current position and heading of the airplane based on the actual position and heading information that was previously retrieved. One skilled in the art will appreciate that various different algorithms may be used to provide the estimates. For example, the algorithm may use a linear extrapolation of the last few positions based on the timer value. The algorithm may also factor in whether the airplane is turning based on the previous position and/or heading information and the ground speed of the airplane. The component then returns the estimated position and heading information.

Figure 23:
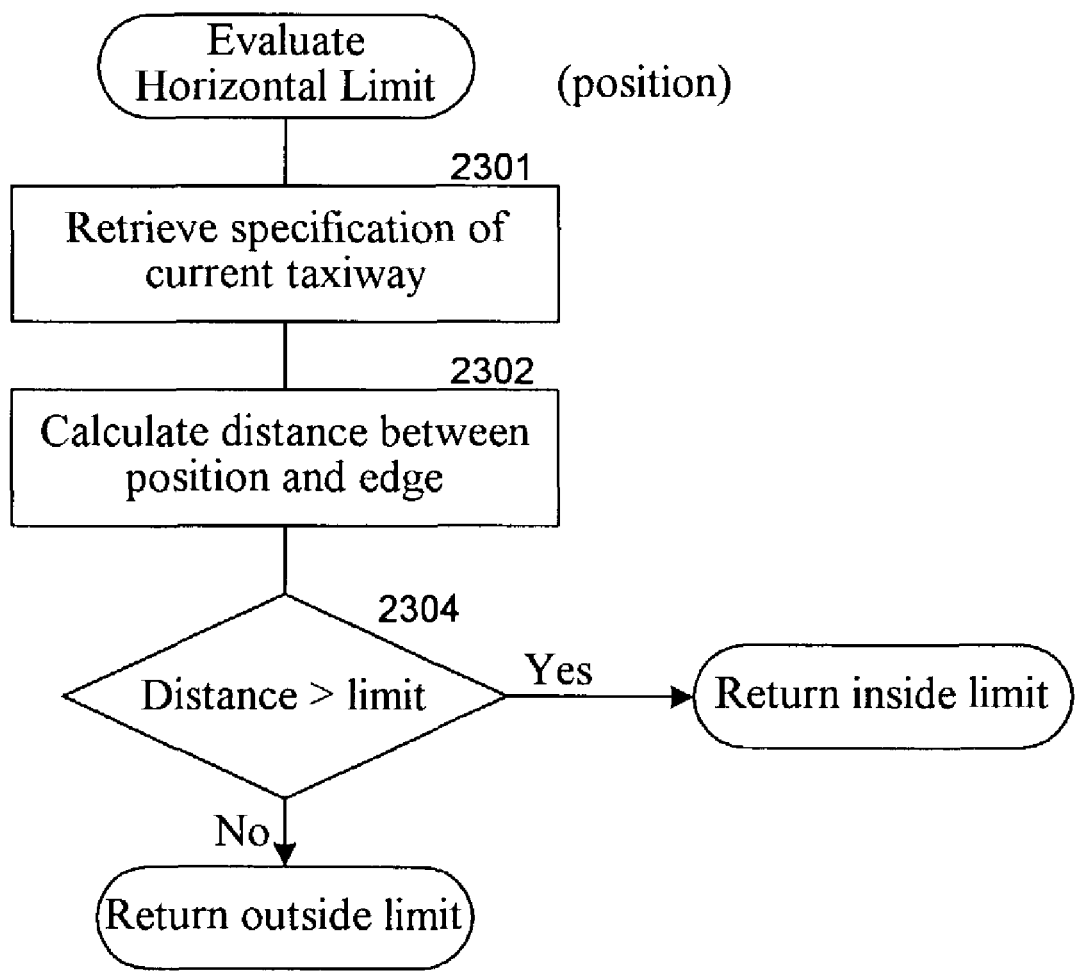
FIG. 23 is a flow diagram illustrating the processing of the evaluate horizontal limit component of the ATNS.

FIG. 23 is a flow diagram that illustrates the processing of the evaluate horizontal limit component of the ATNS. This component determines whether the airplane is near the edge of a taxiway. This component is passed the estimated position of the airplane. In block 2301, the component retrieves information describing the location of the current taxiway. In block 2302, the component calculates the distance between the estimated position and the nearest edge of the taxiway. In decision block 2304, if the distance is greater than a specified limit, then the component returns an indication that the airplane is within an acceptable area of the taxiway, else the component returns an indication that the airplane is not within an acceptable area of the taxiway.

In one embodiment, the ATNS ensures smooth movement of the displayed map using a rotational smoothing algorithm and a movement smoothing algorithm. A sample pseudo code for a rotational smoothing algorithm (when the dynamic mode is heading up) is shown in Table 1 where

TABLE 1 select MRR from a predefined table based on zoom level, speed, and
display update rate
if (CAH ≠ CMH)
HC = CAH − CMH
    if (HC < MRR) or (DL > MDL)
        CMH = CAH
        redraw map
        DL = 0
    else
        add MRR to CMH
        redraw map
        DL = DL + 1

DL = display lag
MDL = maximum display lag
MRR = maximum rotation rate
CAH = current aircraft heading
CMH = current map heading
HC = heading change The rotational smoothing algorithm uses a maximum rotation rate for the map based on the zoom level, airplane speed, and update rate of the display. For example, if the zoom level is low, then a small maximum rotation rate may be used so the displayed map does not appear to jump around as the airplane turns. Similarly, if the update rate of the display is fast, then a small maximum rotation rate may be used because a large rotation amount can be effected by multiple updates over a short period. Also, if an airplane has a high speed, then a small maximum rotation rate may be used because the airplane can rotate very fast. One skilled in the art will appreciate that the maximum rotation rate for these and other factors can be empirically derived to provide a visually pleasing rotation.

The algorithm redraws the map whenever the heading of the airplane and the map are different. The algorithm redraws the map rotated by the change in heading but not exceeding the maximum rotation rate. If the rotation of the map is limited by the maximum rotation rate over several redraws because of a quick turn of the airplane, then the airplane and map headings may be very different. In such a case, the algorithm uses a "display lag" variable to count the number of successive redraws at the maximum rotation rate. If the number of display lags exceeds a maximum number, then the algorithm redraws the map to have the same heading as the airplane, even though it may exceed the maximum rotation rate, to effect an accurate, but nonsmooth rotation.

Sample pseudo code for the movement smoothing algorithm when the display refresh rate exceeds the input rate of the position and heading is shown in Table 2 where

TABLE 2

```
set FH and ES based on previous and current indications
set JC to 0 if source corrects for jitter, otherwise 4
FH = ((FH * JC) + PHI) / (I + JC)
FS = ((FS * JC) + PSI) / (I + JC)
FHV is vector of FH and FS
if (DRR > PRR)
    IF = DRR/PRR
    OP = CP + (FHV/IF)
```

PHI = present heading indication
FH = filtered heading
JC = jitter correction
PSI = present speed indication
FS = filtered speed
FHV = filtered heading vector
DRR = display refresh rate
PRR = refresh rate
IF = iterpolation factor
DP = displayed position
CP = current position The movement smoothing algorithm smooths the heading and speed of the aircraft. The algorithm initially removes jitter from the heading and speed readings by using the average of the last several (e.g., five) readings. If the display refresh rate is faster than the display rate of the readings, then the algorithm calculates an extrapolated position based on the last known position adjusted by an incremental position derived from the heading and speed divided by the ratio of the rates. For example, if the aircraft's heading is constant, its speed is 10 meters per second, the display refresh rate is four per second, and the position refresh rate is two per second, then the algorithm will add five meters (i.e., 10/(4/2)) to the last known position to generate the extrapolated position.

It will be appreciated that although specific embodiments of the ATNS have been described for purposes of illustration, various modifications may be made without deviating from the spirit and scope of the invention. For example, the ATNS may provide a user interface that uses various user interface elements, such as drop-down lists, scroll bars, text boxes, radio buttons, and so on, and uses various input devices, such as a trackball, a mouse, a keyboard, a light pen, a voice recognition system, and so on. One skilled in the art will appreciate that the ATNS may be useful for any type of air vehicle or aircraft as it taxis or otherwise moves about the taxiways or other ways of an airport. In addition, it may be useful to have the ATNS available to ground vehicles (e.g., maintenance and emergency vehicles) that travel around the taxiway or other ways of an airport. The ATNS has been described primarily in terms of taxiing after landing. The ATNS is also useful when taxiing before takeoff. A complete route of an airplane may include gate, taxi route, and runway whether taxiing before takeoff or taxiing after landing. Accordingly, the invention is not limited except by the appended claims.

We claim:

1. A computer-readable medium containing instructions executable by a computer for controlling a computer system to provide information to a crewmember of an aircraft, by a method comprising:
   displaying an airport map on a display in the aircraft;
   receiving a first taxi route segment from a crewmember providing input to an input device on board the aircraft, wherein the first taxi route segment is received by the crewmember though a voice communications channel;
   highlighting the first taxi route segment on the displayed airport map;
   determining a plurality of possible next taxi route segments based on the first taxi route segment;
   receiving a second taxi route segment from the crewmember providing input to the input device, wherein the second taxi route segment is received by the crewmember through the voice communications channel and wherein the second taxi route segment is selected from the plurality of possible next taxi route segments; and
   highlighting the second taxi route segment on the displayed airport map.

2. The computer-readable medium of claim 1 wherein the method comprises receiving a definition of a preferred taxi route.

3. The computer-readable medium of claim 1, wherein the map is displayed in an align-to-runway mode.

4. The computer readable medium of claim 1 wherein the method comprises receiving from a crewmember annotations for the displayed map.

5. The computer-readable medium of claim 1, wherein the method further comprises automatically changing the map display between heading up mode and align-to-runway mode based on behavior of the aircraft.

6. The computer-readable medium of claim 1, wherein the method further comprises:
   receiving position information of the aircraft; and
   when the received position information indicates that the aircraft is on a current taxiway, further highlighting the current taxiway on the map of the airport.

7. The computer-readable medium of claim 1, wherein the method further comprises activating the computer system in response to changes in aircraft status corresponding to aircraft descent or landing approach.

8. The computer-readable medium of claim 1, wherein the method further comprises:
   allowing the crewmember to select only major taxiways; and
   automatically identifying minor taxiways based on the major taxiways.

9. The computer-readable medium of claim 1, wherein the input device is a touch panel.

10. The computer-readable medium of claim 1, wherein the input device is a keypad.

11. The computer-readable medium of claim 1, wherein the input device includes a pointing device.

12. A computer-readable medium containing instructions executable by a computer for controlling a computer system to provide information to a crewmember of an aircraft, by a method comprising:
    receiving first position information indicating a first position of the aircraft;

identifying an airport based on the received first position information;

displaying an airport map associated with the airport on a display in the aircraft;

receiving information specifying a runway, wherein the runway represents a starting point or an ending point of a taxi route specifying taxiways on which the aircraft is to taxi at the airport;

highlighting the runway on the displayed airport map;

receiving, from an input device on the aircraft, a plurality of taxiways specifying portions of the taxi route, including an individual taxiway, wherein the plurality of taxiways are provided by a crewmember on board the aircraft in response to a voice communication and wherein receiving the individual taxiway of the plurality of taxiways comprises:

determining a set of logically possible taxiways for the taxi route based on previously received taxiways or the runway;

providing the set of logically possible taxiways to the crewmember; and receiving a user input selecting the individual taxiway from the set of logically possible taxiways;

highlighting the plurality of taxiways on the displayed airport map;

while the aircraft is navigating the taxi route, receiving second position information indicating a second position of the aircraft;

displaying an indicator of the second position of the aircraft on the displayed airport map; and providing a notification to the crewmember in response to determining that the aircraft has deviated from the taxi route.

13. The computer-readable medium of claim 12, wherein the input device is a touch panel.

14. The computer-readable medium of claim 12, wherein the input device is a keypad.

15. The computer-readable medium of claim 12, wherein the input device includes a pointing device.

16. The computer-readable medium of claim 12 wherein the map is displayed in an align-to-runway mode.

17. The computer readable medium of claim 12 wherein the method further includes receiving from a crewmember annotations for the displayed map.

18. The computer-readable medium of claim 12 wherein the method further comprises automatically changing the map display between heading up mode and align-to-runway mode based on behavior of the aircraft.

19. The computer-readable medium of claim 12, wherein the method further comprises:

when the received second position information indicates that the aircraft is on a current taxiway, further highlighting the current taxiway on the map of the airport.

20. The computer-readable medium of claim 12, wherein the method further comprises activating the computer system in response to changes in aircraft status corresponding to aircraft descent or landing approach.

21. The computer-readable medium of claim 12 wherein the method further comprises:

allowing the crewmember to select only major taxiways; and automatically identifying minor taxiways based on the major taxiways.

* * * * *